(12) United States Patent
Harris et al.

(10) Patent No.: US 12,299,694 B2
(45) Date of Patent: *May 13, 2025

(54) DYNAMIC CLAIMS SUBMISSION SYSTEM

(71) Applicant: Visa International Service Association, San Francisco, CA (US)

(72) Inventors: Theodore Harris, San Francisco, CA (US); Craig O'Connell, San Mateo, CA (US); Yue Li, Sunnyvale, CA (US); Tatiana Korolevskaya, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 18/191,832

(22) Filed: Mar. 28, 2023

(65) Prior Publication Data
US 2023/0237502 A1 Jul. 27, 2023

Related U.S. Application Data

(63) Continuation of application No. 16/610,860, filed as application No. PCT/US2017/032972 on May 16, 2017, now Pat. No. 11,657,402.

(51) Int. Cl.
*G06Q 30/016* (2023.01)
*G06F 16/242* (2019.01)
(Continued)

(52) U.S. Cl.
CPC ......... *G06Q 30/016* (2013.01); *G06F 16/243* (2019.01); *G06N 20/00* (2019.01); *G06Q 10/10* (2013.01); *G06F 40/205* (2020.01)

(58) Field of Classification Search
CPC ........ G06F 40/30; G06F 3/0482; G06F 40/35; G06F 16/3329; G06F 40/56;
(Continued)

(56) References Cited

U.S. PATENT DOCUMENTS 7,398,218 B1 7/2008 Bernaski et al.
9,009,844 B1 4/2015 Corn et al.
(Continued)

FOREIGN PATENT DOCUMENTS

CA 2534738 A1 2/2005
WO 0197083 A1 12/2001

OTHER PUBLICATIONS

U.S. Appl. No. 16/610,860, "Final Office Action", Nov. 7, 2022, 35 pages.
(Continued)

*Primary Examiner* — Sarah M Monfeldt
*Assistant Examiner* — Michael J. Monaghan
(74) *Attorney, Agent, or Firm* — Kilpatrick Townsend & Stockton LLP

(57) ABSTRACT

Embodiments are directed to a method for determining an interview script in a claims submission. The method may comprising receiving data relating to a claim being submitted, which may include claims submission data input by a user, information relating to the user, and one or more features. Data associated with the one or more features may be determined from an artificial intelligence model. A first score based on the data associated with the one or more features and data associated with the information relating to the user may be determined and used to determine an interview script. In one embodiment, questions in the interview script may continue to be provided to the interviewer computer if a continually updated score remains above a predetermined threshold. In another embodiment, the user may be routed to a live interview with a human representative if a continually updated score drops below a predetermined threshold.

20 Claims, 9 Drawing Sheets

(51) Int. Cl.
*G06F 40/205* (2020.01)
*G06N 20/00* (2019.01)
*G06Q 10/10* (2023.01)

(58) Field of Classification Search
CPC .. G06F 16/243; G06F 16/242; G06F 16/9024; G06F 16/24; G06F 16/35; G06F 16/90332; G06N 20/00; G06N 3/08; G06Q 40/08; G06Q 30/016; G06Q 10/10; G06Q 20/4016; G06Q 20/405; H04L 51/02; H04L 67/535
See application file for complete search history.

(56) References Cited

U.S. PATENT DOCUMENTS

| | | |
|---|---|---|
| 9,916,628 B1 | 3/2018 | Wang et al. |
| 10,275,522 B1 | 4/2019 | Hernandez |
| 10,339,527 B1 | 7/2019 | Coleman et al. |
| 10,387,969 B1 | 8/2019 | Wang et al. |
| 10,430,889 B1 | 10/2019 | Ismaili et al. |
| 10,628,834 B1 | 4/2020 | Agarwal et al. |
| 10,846,434 B1 | 11/2020 | Ben-zvi et al. |
| 10,878,428 B1 | 12/2020 | Comeaux et al. |
| 11,087,334 B1 | 8/2021 | McEachern et al. |
| 2006/0285665 A1 | 12/2006 | Wasserblat et al. |
| 2007/0160963 A1 | 7/2007 | Diaz et al. |
| 2007/0294195 A1 | 12/2007 | Curry et al. |
| 2009/0216772 A1 | 8/2009 | Goldfarb |
| 2009/0216803 A1 | 8/2009 | Goldfarb |
| 2010/0145734 A1 | 6/2010 | Becerra et al. |
| 2013/0204645 A1 | 8/2013 | Lehman et al. |
| 2014/0058763 A1 | 2/2014 | Zizzamia et al. |
| 2015/0026027 A1 | 1/2015 | Priess et al. |
| 2015/0032624 A1 | 1/2015 | Claridge et al. |
| 2015/0103984 A1 | 4/2015 | Peterson |
| 2015/0161622 A1* | 6/2015 | Hoffmann ............... H04L 63/20 705/318 |
| 2015/0186901 A1 | 7/2015 | Miltonberger |
| 2015/0189085 A1 | 7/2015 | Riahi et al. |
| 2015/0254675 A1 | 9/2015 | Kannan et al. |
| 2015/0269942 A1 | 9/2015 | Jones |
| 2016/0063645 A1 | 3/2016 | Houseworth et al. |
| 2016/0162474 A1 | 6/2016 | Agarwal et al. |
| 2016/0180470 A1 | 6/2016 | Mascaro et al. |
| 2016/0364794 A1 | 12/2016 | Chari et al. |
| 2016/0379309 A1* | 12/2016 | Shikhare ............... G06Q 40/08 705/4 |
| 2017/0124662 A1 | 5/2017 | Crabtree et al. |
| 2017/0228454 A1 | 8/2017 | Bose et al. |
| 2017/0300831 A1 | 10/2017 | Gelfenbeyn et al. |
| 2017/0324868 A1 | 11/2017 | Tamblyn et al. |
| 2018/0033009 A1 | 2/2018 | Goldman et al. |
| 2018/0225449 A1* | 8/2018 | Byrne ................... G06F 21/554 |
| 2021/0374764 A1 | 12/2021 | Kramme et al. |

OTHER PUBLICATIONS

U.S. Appl. No. 16/610,860, "First Action Interview Office Action Summary", Jan. 13, 2022, 7 pages.
U.S. Appl. No. 16/610,860, "First Action Interview Pilot Program Pre-Interview Communication", Nov. 16, 2021, 8 pages.
U.S. Appl. No. 16/610,860, "Notice of Allowance", Feb. 23, 2023, 20 pages.
Allan et al., "Towards Fraud Detection Methodologies", 5th International Conference on Future Information Technology, May 2010, pp. 1-6.
Liu et al., "Graph Summarization Methods and Applications: A Survey", Jan. 16, 2018, 34 pages.
PCT/US2017/032972, "International Preliminary Report on Patentability", Nov. 28, 2019, 9 pages.
PCT/US2017/032972, "International Search Report and Written Opinion", Aug. 1, 2017, 11 pages.
PCT/US2017/032972, "Supplementary International Search Report", Sep. 17, 2018, 4 pages.

* cited by examiner

DYNAMIC CLAIMS SUBMISSION SYSTEM

CROSS-REFERENCES TO RELATED APPLICATIONS

This application is a Continuation Application of U.S. patent application Ser. No. 16/610,860, filed on Nov. 4, 2019, which is a National Stage of International Application No. PCT/US2017/032972, filed May 16, 2017, which is herein incorporated by reference in its entirety for all purposes.

BACKGROUND

In today's technological environment, companies have various systems for handling complaints, reports, or other claims made by individuals. To process these claims, these companies often allow individuals to connect to their system over the internet or by phone. Human representatives may be trained as to how to interact with the individuals, and sometimes the representatives will be given a set of instructions for different scenarios, such as in the form of a script.

A variety of technical issues may arise from a claims submission system. One such issue is in the case of disingenuous reporting. It is not uncommon for criminals to find ways to game the system in order to make a profit. For example, a criminal may learn of a company's specific protocol for handling various claims, and may figure out how to answer specific questions in order to receive money in the form of statement credits or in insurance payments. With a static predetermined script, this may be relatively easy to accomplish. Another issue is in the case of human error. For claims submission systems handled over the internet, a poorly designed user interface may cause a user to mistakenly type in the wrong information. What is needed in the art is a method for automating the claims submission process in a manner that cannot be easily gamed or abused, and that allows for inaccurate information to be corrected.

Embodiments of the invention address these and other problems, individually and collectively.

BRIEF SUMMARY

Various embodiments are directed to a method for determining an interview script in a claims submission. The method may comprising receiving data relating to a claim being submitted, which may include claims submission data input by a user, information relating to the user, and one or more features. The method may further comprise storing the data relating to the claim submission in a database and retrieving from the database, data associated with the one or more features as determined from an artificial intelligence model. A first score based on the data associated with the one or more features and data associated with the information relating to the user may be determined. An interview script may be determined based at least upon the first score and a first question in the interview script may be provided to an interviewer computer. A response to the first question may be received, and a second score based at least upon the data in the database and the response to the first question may be generated. The interview script may be updated based at least upon the second score, and a second question in the interview script may be provided to the interviewer computer, based at least in part upon the second score.

In one embodiment, questions in the interview script may continue to be provided to the interviewer computer if a continually updated score remains above a predetermined threshold.

In another embodiment, the user may be routed to a live interview with a human representative, if a continually updated score drops below a predetermined threshold.

Other embodiments are directed to systems, server computers, client computers, portable consumer devices, and computer readable media associated with methods described herein.

A better understanding of the nature and advantages of embodiments of the present invention may be gained with reference to the following detailed description and the accompanying drawings.

TERMS

Figure 1:
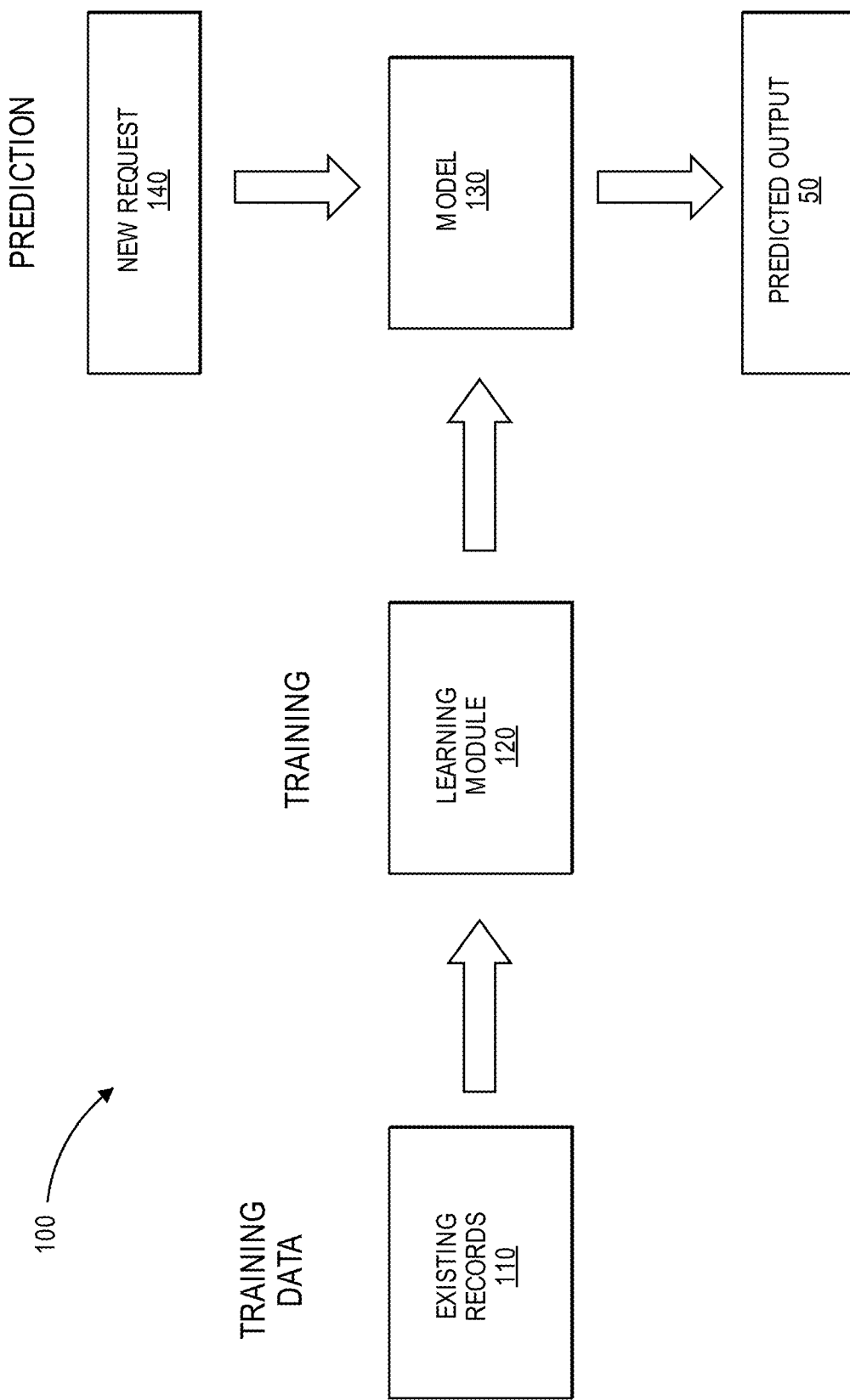
FIG. 1 shows a high-level diagram depicting a process for training and using a machine learning model.

The term "artificial intelligence model" or "AI model" may refer to a model that may be used to predict outcomes in order achieve a pre-defined goal. The AI model may be developed using a learning algorithm, in which training data is classified based on known or inferred patterns. An AI model may also be referred to as a "machine learning model" or "predictive model."

A "feature" may refer to a property of data that may be used to recognize patterns. An input feature may be data that identifiable by an artificial intelligence for making predictions, as learned through training. An input feature may be identified as a collection of one or more input nodes in a graph, such as a path comprising the input nodes. For example, an input feature may be identified as a path (set) comprising input nodes for 'Cardholder: Rick', 'claims lost/stolen credit card' and 'text copy and pasted.' Features may be organized into a searchable format, such as a graph database or index table. For example, input features may be organized as a list of keys that may be indexed, queried, and assigned values for making predictions. When a feature is detected data, an AI model may be used to predict data associated with the feature, such as a predicted riskiness or probability of fraud associated with the feature.

A "conceptual graph" may refer to a graph representation for logic based on the semantic networks of artificial intelligence. A conceptual graph may comprise concepts and conceptual relations for forming a sentence. In a conceptual graph, rectangular nodes may representing concepts and circular nodes may represent conceptual relations. For example, with reference to FIG. 10, a conceptual graph may comprise concept 901(Go) which may be the verb of a sentence. Concept 901 may further be linked to concept 905 (Person: Rick), concept 906 (City: Austin), and concept 907 (Train), which may be nouns linked to "Go" through conceptual relations 902 (Agent), 903 (Destination), and 904 (Instrument) respectively. The conceptual graph may then be used to form the sentence, "Rick is going to Austin by train."

A "concept" may refer to a word or phrase for describing a general idea. For example, an interview for a claims submission may be described by the concepts: 'Cardholder: Rick', 'Lost/Stolen Credit Card', and 'High Risk.' Concepts may be expressed in a topological graph as nodes. In a conceptual graph, concepts may be represented by rectangles.

A "conceptual relation" may refer to a word or phrase for relating concepts. For example, the concept, 'Cardholder: Rick' may be linked to the concept, 'High Risk' through the conceptual relation, 'Is.' The concept, 'Cardholder: Rick' may further be linked to the concept, 'Lost/Stolen Credit Card' through the conceptual relation, 'Claims.'

A "claim submission" may refer to a request for something that is owed. For example, a claim submission may be a submission of an insurance claim, in which a user requests, per an insurance policy between the user and an insurance provider, an owed imbursement of funds. In another example, a claim submission may be a request for an reimbursement of funds related to fraudulent transactions posted to one's purchasing account. In yet another example, a claim submission may be a request for maintenance/repair services that a service provider may grant to its customers.

The term "language parsing" or "linguistic parsing" may refer to the analysis of a string of symbols to recognize words and phrases in a sentence and separate them such that their relationships and meanings may be understood. A linguistic parser may be used to recognize motifs in submitted text, such as motifs related to text that is frequently submitted in fraudulent claims. An example of a linguistic parser may include The Stanford Natural Language Parser.

A "semantic decision table" may refer to a decision table in which decision rules are mapped to concepts. The concepts may be concepts from a conceptual graph, and the decision rules may correspond to rules for forming an interview question. Conceptual relations for determining rules in a semantic decision table may be expressed as binary facts referred to as "lexons." More information regarding semantic decision tables can found at:

Tang Y., Meersman R. (2007) On Constructing Semantic Decision Tables. In: Wagner R., Revell N., Pernul G. (eds) Database and Expert Systems Applications. DEXA 2007. Lecture Notes in Computer Science, vol 4653. Springer, Berlin, Heidelberg.

The term "common logic interchange format" may refer to a standard for specifying common logic. "Common Logic" may refer to a framework for a family of logic languages intended to facilitate the exchange and transmission of knowledge in computer-based systems. The ISO standard for common logic is described in ISO/IEC 24707: 2007. More information can be found at: https://www.iso.org/standard/39175.html.

The term "ant colony optimization" may refer to a probabilistic technique for solving computational problems which can be reduced to finding shortest paths through graphs. Ant colony optimization algorithms may include algorithms in which path information is communicated to a plurality of computational agents between subsequent iterations.

A "topological graph" may refer to a representation of a graph in a plane of distinct vertices connected by edges. The distinct vertices in a topological graph may be referred to as "nodes." Each node may represent specific information for an event or may represent specific information for a profile of an entity or object. The nodes may be related to one another by a set of edges, E. An "edge" may be described as an unordered pair composed of two nodes as a subset of the graph G=(V, E), where is G is a graph comprising a set V of vertices (nodes) connected by a set of edges E. For example, a topological graph may represent a transaction network in which a node representing a financial transaction may be connected by edges to one or more nodes that are related to the transaction, such as nodes representing information of a device, a merchant, a transaction type, etc. An edge may be associated with a numerical value, referred to as a "weight", that may be assigned to the pairwise connection between the two nodes. The edge weight may be identified as a strength of connectivity between two nodes and/or may be related to a cost or distance, as it often represents a quantity that is required to move from one node to the next.

A "sequence graph" or "graphic sequence" may refer to a sequence of numbers which can be the degree sequence of a graph. For an undirected graph, a "degree sequence" may refer to a sequence of nodes in a graph. For example, a degree sequence may identify a path of nodes for establishing rules for an AI model.

DETAILED DESCRIPTION

Embodiments of the invention are directed to a method for determining an interview script. Embodiments described in the detailed description herein may comprise a method that uses an artificial intelligence (AI) model to generate an interview script based on features of a submitted claim. The AI model may provide questions to an interviewer computer, such that only accurate information may be included in a processed claim. This may be done by providing follow-up questions that may assist in clarifying incorrectly entered information. In the instance of a false claim being submitted, questions may be continually asked until the submitter of the false claim quits the interview. Features used to assess the risk of a potentially fraudulent claim or a claim containing potentially inaccurate information may include data associated with user information and data associated with text inputted by the user, as identified through patterns learned by an AI. The AI may continuously adapt to new features associated with a disingenuous claim submission, and may dynamically update the interview script such that a criminal actor may not easily game the claim submission system.

I. Overview of Invention

Embodiments of the invention are directed to a system for generating a dynamic interview script using artificial intelligence. FIG. 1 shows a high-level diagram depicting a process for training and using a machine learning model. Process 100 starts with training data, shown as existing records 110. The training data can comprise various data samples, where each data sample includes input data and known output data. For example, training data may be aggregated from a variety of sources across multiple networks, such as transaction networks and social media networks. The input data can be profile data of a user (e.g. a user's transaction records or social media data), and the output data can be a classification of their behavior (e.g. high risk individual or low risk individual).

After training data is obtained, a learning process can be used to train the model. Learning module 120 is shown receiving existing records 110 and providing model 130 after training has been performed. As data samples include outputs known to correspond to specific inputs, a model can learn the type of inputs that correspond to which outputs. Once model 130 has been trained, it can be used to predict the output for a new request 140 that includes new inputs. For instance, model 130 may be a model that can predict whether a user is lying based on features of the user's communication. Model 130 is shown providing a predicted output 150 based on new request 140. Predictive output 150 may be any output that is predicted to achieve a desired result, such as a phrase or question that is predicted to deter a criminal. In this manner, the wealth of the training data can be used to create artificial intelligence that can be advantageously used for a particular problem. As explained above, the invention described herein utilizes an artificial intelligence model for the purpose of generating a dynamic interview script. The interview script may be used, for example, processing a claim such an insurance claim, or may be used for any interaction in which an interviewee is requiring assistance with a particular matter.

Figure 2:
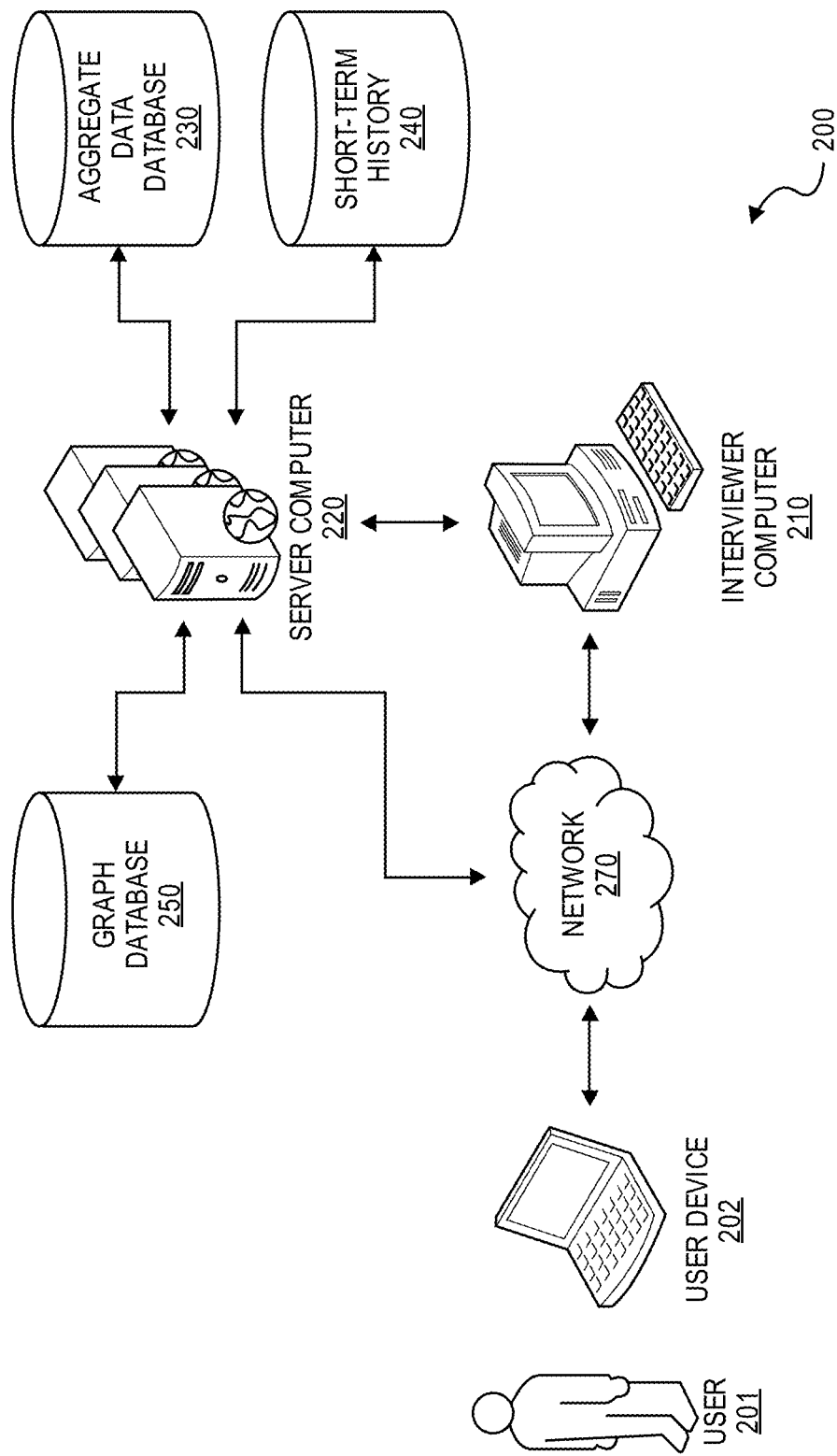
FIG. 2 shows a depiction of a system for conducting an interview according to an embodiment of the invention.

FIG. 2 shows a depiction of a system for conducting an interview according to an embodiment of the invention. System 200 may comprise user device 202, interviewer computer 210, and server computer 220. The user device 202 may be operated by a user 201 and may be in communication with the interviewer computer 210. The interviewer computer 210 may receive back-end support from one or more server computer(s) such as server computer 220. In addition, server computer 220 may be coupled to or have access to one or more sources of data (i.e. databases) such as from aggregate data database 230, short-term history 240, and graph database 250.

According to embodiments of the invention, user 201 may use user device 202 to conduct an interview with interviewer computer 210 (e.g. such as for a claims submission or for reporting an incident or broken device). This may be done by establishing a channel of communication with interviewer computer 210 over a network 270 such as the internet or telecommunications network. User device 202 may be any device for sending information to interviewer computer 210 over network 270, such as a personal computing device, laptop, mobile communications device, telephone, etc. User device 202 may be used to send messages that may be received and processed by interviewer computer 210 in the form of data. For example, an input device of user device 202 such as a keyboard may be used to generate text that may be sent as data to interviewer computer 210. In another example, user device 202 may be used to send voice messages over a telecommunications network, which interviewer computer 210 may receive and process into data. In yet another, user device 202 may be used to take a picture and generate an image file that may be sent to interviewer computer 210.

Messages received by interviewer computer 210 from user device 202 may comprise data relating to a claim submission. A claim submission may be any request for something that is owed. For example, a claim submission may be a submission of an insurance claim, in which a user requests, per an insurance policy between the user and an insurance provider, an owed imbursement of funds. In another example, a claim submission may be a request for an reimbursement of funds related to fraudulent transactions posted to one's purchasing account. In yet another example, a claim submission may be a request for maintenance/repair services that a service provider may grant to its customers.

The data relating to the claim submission may be sent from interviewer computer to server computer 220. Server computer 220 may be any server computer for receiving, processing, storing, retrieving, and sending data. For example, server computer 220 may be a server computer of a transaction processing network (e.g. Visanet) that may receive, process, store, retrieve, and send data relating to transactions. In one embodiment, server computer 220 may be a server computer that receives, processes, stores, retrieves, and sends data to a client computer in a client-server model. The client computer may be, for example, an interviewer computer. In another embodiment, server computer 220 may be a server computer that receives, processes, stores, retrieves, and sends data in a cloud-based model.

Server computer 220 may store, update, and retrieve data from one or more databases such as, aggregate data database 230, short-term history database 240, and graph database 250. The data in the one or more databases may be data used by server computer 220 to generate, and make predictions using, an artificial intelligence (AI) model. The AI model may run on server computer 220, and may be used to predict appropriate responses for achieving a predetermined goal. In one embodiment of the invention, the predetermined goal may be to prevent false or inaccurate information from being included in a processed claim. This may be done, for example, by predicting and generating responses that may deter a criminal actor from continuing a claims submission or generating responses that clarify information that is frequently entered incorrectly.

Aggregate data database 230 may store aggregate data that is shared across multiple networks. The aggregate data may be accessed by server computer 220 and used as training data for an AI model. For example, the aggregate data may be collected in a transaction network and used to generate predictive models relating to the behavior of the transacting parties. Examples of aggregate data may include fraud data, real-time data feeds, and other outside data. Fraud data may comprise data regarding fraudulent transactions, such as negative lists linking transaction identities (e.g. account numbers, user IDs, device IDs, etc.) to reported instances of fraud. Real-time data feeds may include data that is received over a network in real-time such as data for transactions being conducted. Other outside data may include any other data that can be extracted and used to make predictions, such as census data, financial data, social media data, etc. In one embodiment, the aggregate data may be data that is stored and processed across multiple computers according to the Apache Hadoop framework.

Short-term history 240 may comprise short-term data that can be used for making current predictions. Short-term data may include prior requests to an AI model (i.e. historical requests for a prediction), which may be used to detect features present in information and predict a present outcome. For example, short-term data may include a history of messages sent between user device 202 and interviewer computer 210 or other messages sent between other user devices and other interviewer computers. The history of messages may be used to determine an appropriate response to a current message sent from user device 202 to interviewer computer 210 (e.g. a follow-up question to an answer submitted by user 201).

Graph database 250 may comprise graph data for generating an interview script. The graph data may include a plurality of conceptual graphs for representing knowledge and reasoning. The plurality of conceptual graphs may be used to represent concepts used in a semantic network for an AI model. For example, graph data may comprise a plurality of conceptual graphs representing an appropriate combination of words and phrases for forming a sentence. The formed sentence may be used to generate a response to user 201 during an interview, as determined using an AI model running on server computer 220 and as delivered by interviewer computer 210.

According to embodiments of the invention, data received and/or retrieved by server computer 220 may be used to build an AI model for making predictions. The AI model may be used to determine responses to user 201 in an interview (e.g. claims submission). The generated responses may be responses that are predicted to assist in identifying inaccurate information. For example, an appropriate response predicted by an AI model may be a follow-up question that clarifies if user 201 has correctly inputted text into user device 202 (e.g. "You live in Texas, is that correct?"). In another example, a response may be a follow-up question that reveals if user 201 is likely giving false information (e.g. "When did you first notice that your card was lost or stolen?").

Server computer 220 may use aggregate data in aggregate data database 230 as training data for building and updating the AI model. For example, data relating to interview questions, user responses, previous outcomes of previous interviews, and external data (e.g. fraud data) may be used to identify patterns. This may be done, for example, using a learning algorithm to score a plurality of interview questions and user responses for their predictiveness of desired outcomes (e.g. scoring interview questions higher if they deter a fraudulent individual or giving a high risk score to user responses linked to known incidences of fraudulent claims). Specific types of information that can be scored for predictiveness and used to train and generate a better fitting model may be referred to as features. For example, a feature may be the speed at which a question is responded to by a user, and the feature may be scored for its relation to a high probability of fraud (e.g. a question that is responded to in less than 1 second may be indicative of fraudulent behavior and may receive a high score). If in a future request to the AI model a high scoring feature is detected (e.g. response time less than 1 second), then the AI model can make a prediction based on the feature due to its known correlation to a specific outcome (e.g. high probability of fraud).

During an interview, messages may be sent between user device 202 and interviewer computer 210, and may comprise data that may be sent to server computer 220. The data may be stored in short-term history 240 and may be data relating to a claim submission. The data relating to the claim submission may include data input by user 201 (e.g. text), information relating to user 201 (e.g. name, account number, device ID, IP address, etc.), and one or more features (e.g. risk features). The one or more features may be predictive features that may be identified and used in an AI model for making predictions. In one embodiment, the one or more features may include a time of day, a claim type, a method of entry, and/or an average time to respond. In another embodiment, the one or more features may also include features of text inputted by the user. For example, a natural language parser may be used to parse a sentence and determine features that are indicative of certain behavior, such as lying.

The one or more features may be used by an AI model running on server computer 220 to determine data associated with the one or more features. For example, an AI model running on server computer 220 may compare the one or more features to an index table of predicted outcomes (e.g. associated risk of each feature), as learned through training. Server computer 220 may further determine data associated with the information relating to user 201. For example, server computer 220 may retrieve, from aggregate data database 230, data linking user 201's account number to high risk behavior (e.g. identified fraud or low credit score).

The data determined from the AI model and the data associated with user 201 may then be used by the server computer to determine a first score for the interview. The first score may be, for example, a risk score assessing the currently evaluated risk of user 201 being disingenuous or of the information submitted by user 201 being inaccurate or false. The risk score may be stored by server computer 220 in short-term history 240 and may be used to update the AI model. For example, the risk score may be used to score the predictiveness of the one or more features so that future predictions made by the AI model may be more accurate.

Server computer 220 may then determine an interview script based at least upon the first score. In one embodiment, server computer 220 may query graph database 250 for a conceptual graph based on the first score, data associated with user 201, and data associated with information entered by user 201 (e.g. a conceptual graph comprising words of user entered text or features thereof). For example, server computer 220 may determine that a user identified as 'Cardholder: Morty' submitted a response containing the word, "Singapore" in less than a second. An AI model may be used to determine that the response is associated with a risk score of 90 out of 100. Server computer 220 may then generate a graph query comprising, 'Cardholder: Morty', 'Singapore', and 'risk score=70 or higher.' The graph query may be performed to retrieve a conceptual graph from graph database 250 for a conceptual graph comprising nodes for 'Cardholder: Morty' 'Singapore' and 'risk score=70 or higher.' The conceptual graph may comprise nodes for concepts (e.g. 'Morty' 'Singapore', 'risk score=70 or higher') linked together through conceptual relations. For example, the concepts may be linked by the conceptual relations: 'Agent', 'lives', 'is', and 'initiate,' which may derive meaning for initiating the decision: 'Morty lives in Singapore and is high risk [risk score>70]. Initiate script A:High Risk.' An interview script may then be determined from the conceptual graph (e.g. 'script A:High Risk), and a follow-up question from the interview script may be sent to user device 202 (e.g. "would you like to be continue the interview in Mandarin?").

According to embodiments, a user response to a follow-up question from a determined interview script may be evaluated to determine a second score for the interview. For example, an interview script determined for a phone interview may comprise the question, "what is your mother's maiden name?" The user may respond instantly, and in a manner that is determined to be low risk (e.g. an AI model for predicting the risk of a lying user based on features of audio data may determine a low risk score). The features of the user's response may change the score for the interview, and the second score for the interview may result in a different query. For example, a second graph query may be performed in which a conceptual graph may comprise nodes for initiating the decision: 'Morty is low risk. Initiate script A: low risk.' The determine interview script may then be updated based on the graph query, and a second question from the interview script may be sent to the user (e.g. "Your mother's maiden name is 'Smith,' is that correct?")

In one embodiment, a determined interview script may be generated such that an individual identified as potentially giving false or inaccurate information may not be allowed to submit a claim for processing. The automated questions of the determined interview script may be generated such that interviews scoring higher with regards to inaccuracy may receive more aggressive questioning, such as to extract more information from user 201. In one embodiment, automated questions/responses may be continually sent to user 201, until user 201 terminates the claim submission or submits responses that lower the risk score for the interview below a predetermined threshold (e.g. by providing accurate information). In another embodiment, individuals identified as being low risk or providing accurate information may be routed to a live agent (i.e. a human interviewer) who may process the submitted claim.

Figure 3:
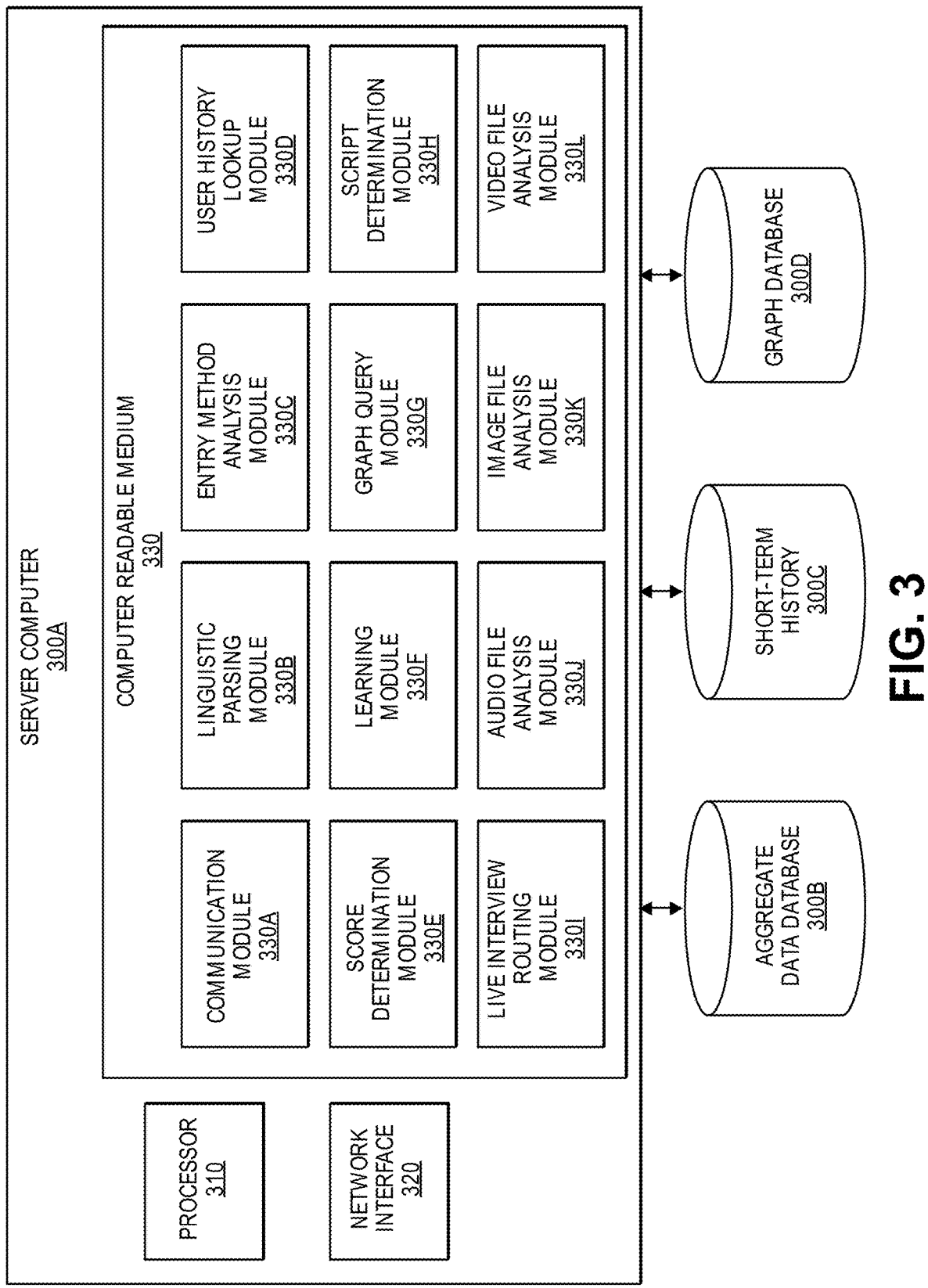
FIG. 3 shows a block diagram of a server computer according to an embodiment of the invention.

FIG. 3 shows a block diagram of a server computer according to an embodiment of the invention. Server computer 300A may be any server computer for receiving, processing, and sending data according to the embodiments of the invention, such as server computer 220 of FIG. 2. Server computer 300A may comprise processor 310, network interface 320, and computer readable medium 230. Computer readable medium 230 may comprise one or more modules of code that may be used to carry out embodiments of the invention. For example, computer readable medium 230 may comprise communication module 330A, linguistic parsing module 330B, entry method analysis module 330C, user history lookup module 330D, risk determination module 330E, learning module 330F, graph query module 330G, script determination module 330H, live interview routing module 330I, audio file analysis module 330J, image file analysis module 330K, and video file analysis module 330L. Server computer 200A may further be coupled to one or more databases such as aggregate data database 300B, short-term history 300C, and graph database 300D, which may correspond to aggregate data database 230, short-term history 240, and graph database 250 of FIG. 2 respectively.

Communication module 330A may comprise code for instructing processor 310 to receive, send, and reformat messages that may be received over network interface 320. For example, communication module may comprise code for receiving and sending messages over a network (e.g. network 270 of FIG. 2) during an interview process, such as during a claim submission.

Linguistic parsing module 330B may comprise code for instructing processor 310 to analyze a string of symbols. For example, the string of symbols may be text received in a message and linguistic parsing module 330 may comprise code for recognizing words and phrases in a sentence and separate them to understand their relationships and meanings. In one embodiment, linguistic parsing module 330B may comprise code for a natural language parser or statistical parser such as The Stanford Natural Language Parser.

Entry method analysis module 330C may comprise code for instructing processor 310 to determine information relating to how received data was originally entered by a user. In one embodiment, entry method analysis module may comprise code for determining how quickly text data was entered, determining if inputted text had been copy and pasted, and/or determining the length of pauses between typed information. For example, entry method analysis module may be used to determine that user 201 of FIG. 2 answered an interview question by quickly copy and pasting a predetermined response stored on user device 202, and this feature may later be identified as a strong predictor of a fraudulent claim submission.

User history lookup module 330D may comprise code for instructing processor 310 to lookup data associated with information relating to a user. For example, user history lookup module 330D may comprise code for determining a user ID or a device ID and other user information extracted from data received in a message (e.g. data relating to a claim submission), and may further comprise code for querying aggregate data database 300B for data linked to the user ID or device ID. The data may include a history of behavior relating to the user such as a history of interviews (e.g. history of claim submissions), known instances of fraud, or reports of the user's information being stolen.

Score determination module 330E may comprise code for instructing processor 310 to determine a score associated with received data. In one embodiment, the score may be a score associated with a user response in an interview or for an interview itself. The score may be determined based on one or more features and data associated with a user and his or her responses. For example, score determination module 330E may comprise code for recognizing one or more risk features associated with text input by a user in a claims submission. Score determination module 330E may further comprise code for determining a risk score based on the one or more risk features. According to embodiments of the invention, examples of risk features may include a time of day a message is sent, a claim type, a method of entry for received data, and/or an average time to respond (i.e. how quickly data was entered after an interview question has been asked).

Learning module 330F may comprise code for instructing processor 310 to train an AI model for making predictions about received data. For example, learning module 310 may comprise a machine learning algorithm that may be used to generate and update an AI model based on data stored in a database. The AI model may be used to make predictions based on input data. For example, the predictive model may be used to predict an appropriate follow-up interview question based on a response from a user (e.g. based on text in a claims submission).

Graph query module 330G may comprise code for instructing processor 310 to perform a query for a graph stored in a graph database, such as conceptual graph data database 300C. For example, graph query module 330G may comprise code for querying graph data database 300C for a conceptual graph linked to a specific risk score and/or set of text. The specific risk score and set of text may be information relating to a claims submission (e.g. a set of text inputted by a user). In one embodiment, the graph that is to be queried by graph query module 330G may be used to determine binary facts, or "lexons" in a semantic decision table for driving an interview script. For example, the graph may comprise relationships between risk scores and concepts for an interview (i.e. words or phrases), which may be used to determine appropriate paths for the interview, as defined by a prebuilt semantic decision table comprising claim submission rules.

Script determination module 330H may comprise code for instructing processor 310 to determine a script based on a queried graph. For example script determination module 330H may comprise code for determining a set of text associated with information relating to a conceptual graph. The information relating to the conceptual graph may comprise concepts and conceptual relations that may be used to form a sentence. In one embodiment, the information relating to the conceptual graph may be information in a semantic decision table, such as lexons reflecting rules for different sets of interview concepts.

Live interview routing module 330I may comprise code for instructing processor 310 to connect a user device to a human interviewer. For example, live interview routing 330I may comprise code for routing a user device (e.g. user device 202 of FIG. 2) from connecting with an interviewer computer running an automated script (e.g. interviewer computer 210 of FIG. 2) to an interviewer computer or call center from which they may speak to a representative that may process a claim. In one embodiment, live interview routing module 330I may be initiated if it is determined that a submitted claim is genuine (e.g. very low risk score).

Audio file analysis module 330J may comprise code for instructing processor 310 to analyze features of an audio file. For example, audio file analysis module 330J may comprise code for detecting a long pause in a response or may detect an inflection in a user's voice. The features of the audio file may be any pattern that may be repeatedly recognized by an AI model in data and that may be indicative of certain behavior. For example, an audio file for a claims submission in which a user's voice is relatively monotone may be indicative of a fraudulent claim. In another example, an audio file for a user reporting an incident in which the user's voice is shaky or hurried may be indicative of a user who is sincere in reporting a real incident.

Image file analysis module 330K may comprise code for instructing processor 310 to analyze features of an image file. For example, image file analysis module 330K may comprise code for recognizing facial features to recognize a user. In other examples, image file analysis module 330K may comprise code for recognizing features of objects that may be related to a submitted claim, such as features of credit cards, bar codes, packages, vehicles, products, damaged body tissue, etc. The features of the image file may be any pattern that may be repeatedly recognized by an AI model in data and that may contain more information for making better predictions. For example, an image file for a photo of a car accident may comprise a specific amount of light as a feature, which may indicate the time of day the photo was taken or may be indicative of some other pattern such as a certain level of risk for a claims submission. In another example, an image file may contain a slight nuance in color or contrast that may be a feature of photos taken with a specific type or manufacture of camera lens which may further be associated with a certain level of risk in a claims submission.

Video file analysis module 330L may comprise code for instructing processor 310 to analyze features of a video file. For example, video file analysis module 330L may comprise code for recognizing features of a video that is the same or similar to a video submitted for a fraudulent claim. The features of the video file may be any pattern that may be recognized by an AI model and that may aid in making better predictions. For example, a video length or file size may be a feature that is indicative of whether a submitted claim is fraudulent or genuine.

According to embodiments of the invention, server computer 300A may provide back-end support for an interview computer, such as interviewer computer 210 of FIG. 2. The server computer 300A may be used to generate an automated interview script comprising responses that are predicted to assist in identifying inaccurate or false information. The script may further be a script comprising questions predicted to deter criminal actors/prevent inaccurate or false information from being included in a processed claim.

Figure 4:
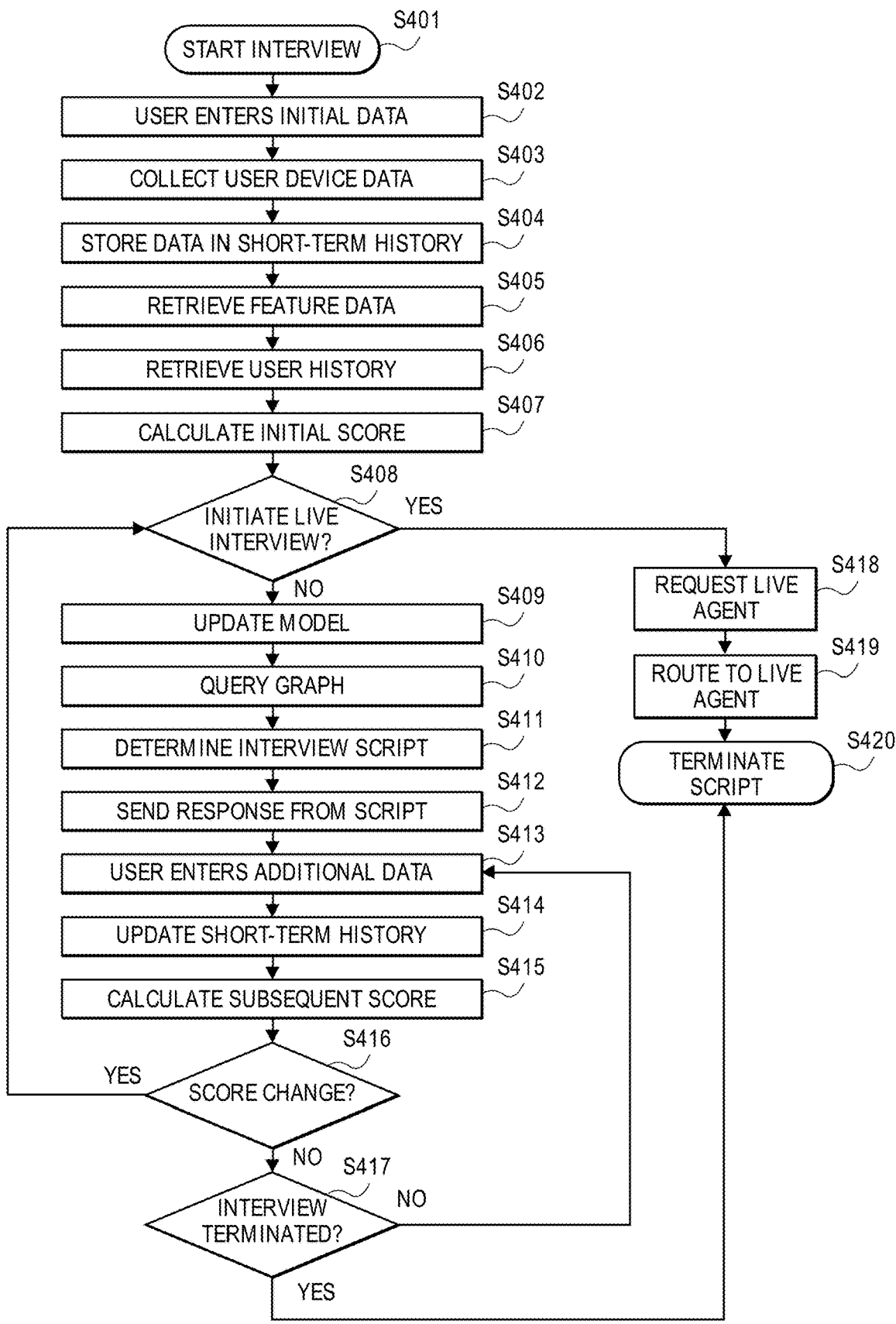
FIG. 4 shows a process flow diagram for conducting an interview according to an embodiment of the invention.

FIG. 4 shows a process flow diagram for conducting an interview according to an embodiment of the invention. According to embodiments of the invention, an interview may be conducted between a user device (e.g. user device 202 of FIG. 2) and an interviewer computer (e.g. interviewer computer 210 of FIG. 2). The interview computer may base its responses to a user of the user device (e.g. user 201 of FIG. 1) on an interview script that can be determined using an AI model.

Process 400 may begin at step S401, in which an interview between a user device and interviewer computer may be started. The interview may be initiated by a user that establishes a connection with an interview system (e.g. a claim submission system). The connection may be established by establishing a connection between a user device and an interviewer computer over a network. For example, the user may use the user device to connect to the internet and may establish a connection with the interview system by accessing a website from a browser. In another example, the user device may be a phone, and the user may establish a connection with the interview system over a telecommunications network. Upon connecting with the interview system, the user may begin an interview with the interviewer computer.

At step S402, the user may submit initial data using the user device. The initial data may be data relating to a claims submission, which may include text, audio, images, or video submitted by the user. For example, the interview system may provide a user interface that may be displayed on the user's device and allow the user to input text. The initial data may be sent to the interviewer computer and forwarded to a server computer (e.g. server computer 300A of FIG. 3). The text may include a description of the claim that is being submitted or incident that is being reported. For example, the user may use an input device (e.g. keyboard) of the user device to input text for, "Hi, I would like to report a stolen credit card." In another example, the user may contact the interview system via phone. The user may submit information for a claim by voice and the submitted audio may be processed into data. In yet another example, the user may send a Short Message Service (SMS) text message to the interview system to initiate the claims submission process using his or her phone. Other examples of data relating to a claims submission may include image data (e.g. a selfie of the user, a photo of a credit card, an image of a damaged vehicle, etc.) or video data (e.g. a video of an incident that the user wishes to report or a video of the user explaining an incident).

At step S403, user device data may be collected. In one embodiment, the user device data may be collected by analyzing the header of a message. For example, the interviewer computer may receive a data message from the user device in which a device ID and/or IP address of the user device is written into a header of the message. In another embodiment, the user device may be a phone, and the user device data may comprise a telephone number and a location of the phone. For example, the interviewer computer may receive an SMS or Multimedia Messaging Service (MMS) text message comprising a user data header (UDH) at the start of the message. According to embodiment, the user device data may be received by the interviewer computer and forwarded to the server computer.

At step S404, the initial data entered by the user and the collected user device data may be stored in short-term history. The short-term history may be a database comprising data that may be used to determine an interview script. For example, the short-term history may comprise data for the current conversation between the user device and interviewer computer. The data may comprise features that may be used as inputs to an AI model. The AI model may be an AI model trained to predict appropriate responses that assist in identifying accurate and inaccurate information in a claims submission.

At step S405, the server computer may determine one or more features from the data relating to the claim submission and may retrieve data associated with the one or more features from a database (e.g. aggregate data database 230 of FIG. 2). For example, the server computer may analyze the data relating to the claim submission (e.g. using entry method analysis module 330C of FIG. 3) to determine a time of day, a claim type, and a method of entry, which may be recognized as risk features linked to varying levels of risk for an interview. The data associated with the one or more features may then be stored in short-term history. In one embodiment, the data associated with the one or more features may be data that is determined using an AI model. For example, an AI model may be trained using a learning algorithm to predict a level of risk associated with the one or more risk features.

At step S406, the server computer may retrieve the user's history. In one embodiment, the server computer may retrieve the user's history from a database. For example, the server computer may query aggregate data database 230 of FIG. 2 for data linked to the user and/or the user device. This may be done based on the user device data collected at step S403 (e.g. querying a database for data linked to a device ID or IP address). Examples of user history that may be retrieved may be data for previous claim submissions made by the user, identified instances of fraud linked to the user device, or any other data that may be associated with the user's behavior. The user's history may then be stored in short-term history. In one embodiment, the user's history may include risk data associated with the information relating to the user. For example, the user's history may include a level of risk associated with communication factors of the user (e.g. IP address, device ID, telephone number, etc.). In an embodiment, the associated risk may be determined from index tables. The index tables may comprise risk indexes for various communication factors of the user, as predicted by an AI model, such as through a boosted tree or neural network. The risk indexes may be predicted in real-time from data in a transaction processing network (e.g. VisaNet) along with external data relating to IP address behavior that may be aggregated from other sources.

At step S407, the server computer may calculate an initial score for the interview based on data stored in short-term history. The initial score may be determined based on at least the feature data and user history collected at steps S405 and S406 respectively. The initial score may be determined based on the predictiveness of the feature data, as learned through training. A learning algorithm may be used to score the predictiveness of features that may later be present in data, and the output associated with the features may be predicted based on the learned scores. For example, gradient boosting may be used to populate an index table or decision tree, in which various combinations of feature data may each be linked to different interview scores. In one embodiment, a risk model for assessing the likelihood that a submitted claim is fraudulent may be used to generate a risk score for the interview. For example, an ensemble learning method such as a random decision forest may be used to generate regression trees for predicting the probability of fraud associated with an IP address and inputted user text. When data is received in a claim submission, the IP address and inputted text associated with the submitted claim may be compared to the regression tree in order to determine a risk score, scoring the probability of a positive identification of fraud for the claim. For example, the user may have entered text that is an exact duplicate from a previous interview that was determined to be high risk, which may result in a high risk score (e.g. risk score of 90 on a scale of 0 to 100) due its high correlation to a known instance of fraud.

At step S408, the server computer may determine, based on the initial score, if a live interview with a human interviewer should be initiated. In one embodiment, the live interview may be initiated if the initial score is determined to indicate that the data relating to the claim submission has a high probability of containing 100% accurate information. For example, a user may submit a request for customer support that may be determined to have a low risk score (i.e. a genuine claim submission) and may thus warrant the initiation of a live interview with a human representative that may assist the user. In an embodiment, a live interview with a human representative may be initiated if a score for the interview drops below a predetermined threshold (e.g. a risk score below 50).

At step S409, the server computer may update an AI model for determining an interview script. In one embodiment, the AI model may be updated such that the feature data and user history may be correlated. For example, the user history may contain data that has been identified as fraudulent and one or more features of the text input by the user may then be correlated to fraud in the AI model. This may affect predictions made by the AI model during an interview. For example, if the same text is repeated in subsequent claim submissions then the subsequent claim submissions may be determined to be associated with fraud. In another embodiment, the AI model may be updated such that the one or more features and the user history may be associated with higher risk. For example, the one or more features may cause the interview to receive a high risk score, which may correlate the user's history (e.g. user ID, device ID, IP address etc.) with higher risk in the AI model.

At step S410, the server computer may query a graph database for a graph based on a prediction made by the AI model. The graph may be a conceptual graph relating concepts to predicted levels of risk. In one embodiment, the AI model may receive the initial score for the interview, initial data entered by the user (i.e. text), the one or more features, and the user history as inputs for predicting an appropriate graph query. In one embodiment, a graph query may be expressed in common Logic interchange format. For example, a graph query related to 'Claimant 123' reporting a purchased item that was not received may be expressed as, (exists ((x Report) (y Fraud-Not received)) (and (claimant 123) (agent x 123) (type x y))). In one embodiment, the graph that is queried and retrieved from the graph database may be a conceptual graph for forming a sentence. In another embodiment, the server computer may send the queried graph to the interviewer computer so an interview script may be determined. In yet another embodiment, the queried graph may be used to identify probability of fraud. For example, an optimization technique for finding shortest paths in a graph (e.g. ant colony optimization) may be used to find a path within a graph that links concepts to a positive indication of fraud. The probability of fraud may be a function of the complexity of a claim, the cost of the path linking detected concepts to fraud (i.e. total edge weight of the path in a topological graph), and various factors relating to the potential monetization or payout of a claim. For example, the probability of fraud may be calculated as: 'Prob Fraud=f(Claims complexity, Path Cost, Detection Easy, Pay out amount)'. More information regarding using ant colony optimization to find optimal paths in a graph may be found at:

C. Blum, "Ant colony optimization: Introduction and recent trends", Phys. Life Reviews, vol. 2, pp. 353-373, 2005.

At step S411, the interview script may be determined from the graph retrieved from the graph database. The graph may be a conceptual graph that may be used to form one or more responses (i.e. sentences) that may be used in the interview. For example, a conceptual graph may be retrieved that contains the words "location" "user" "live," which may be used to form the sentence, "Where do you live?" In one embodiment, the interview script may be determined by the interviewer computer or an agent operating the interviewer computer. In another embodiment, information for the queried graph may be stored in a semantic decision table. The semantic decision table may contain logic for linking a predicted outcome made by the AI to facts or lexons. For example, the AI model may predict an outcome of 'high risk' for the interview, which may be linked in a semantic decision table to words or phrases that may be linked to a follow-up question for asking someone where they live.

At step S412, a response from the interview script may be sent to the user and/or user device. In one embodiment, the response may be sent to the user device from the interviewer computer in a message. For example, the response may be sent to the user device over the internet in the form of a message containing text that the user can read (e.g. in a text message or through HTML). In another embodiment, the response may be sent to the user from an operator of the interviewer computer. For example, the operator may read the determined interview script and communicate a response from the interview script to the user over the phone.

At step S413, the user may receive the response from the interview script and may enter additional data. The additional data may be additional data relating to the claim submission. For example, the user may receive a question from the interview script and may generate an answer by inputting text into the user device. The text may be additional information that may be used to determine if the claim being submitted is fraudulent or not. The additional data may be sent to the interviewer computer and then forwarded to the server computer.

At step S414, the server computer may receive the additional data and may update the short-term history. Updating the short-term history may comprise storing the additional data as well as data relating to one or more features recognized from the additional data. For example, the additional data may comprise text that has been copy and pasted, which may be a risk feature that can be used to calculate a subsequent risk score for the interview. A record of the risk feature being present in the user's response, as well as the response itself, may be added to the short-term history alongside the short-term data stored at step S404.

At step S415, the server computer may calculate a subsequent score for the interview. The subsequent score may be determined using the additional data entered by the user, one or more features associated with the additional data, and/or any other data stored in the short-term history (e.g. data stored at step S404). For example, the server computer may determine a subsequent risk score for the interview based on the text of the user's response to a follow-up question and based on the method of entry for the text.

At step S416, the server computer may determine if the score for the interview has changed. A score may remain unchanged, for example, if a user has yet to respond to a follow-up question from the interview script. If the score for the interview has not changed (e.g. user has not responded yet), then the server computer may perform step S417. Otherwise, the server computer may return to performing step S408 in the process. The server computer may continue to update the model, perform graph queries, and determine scripts, and the user may continue responding to affect the score for the interview until either the interview is terminated or until it is determined that a live interview should be initiated (i.e. performing steps S409 though S416 until either the answer to S408 or S417 is "yes"). For example, if the risk score of the interview progressively increases with each follow-up question and user response, then follow-up questions may continually be sent to the user until either the user quits the interview or begins to enter accurate information that lowers the risk score. If the risk score drops below a threshold, it may be determined that the information submitted is genuine and a live interview may be initiated.

If at step S416 it is determined that the score for the interview has not changed, step S417 may be performed, in which the server computer may determine if the user has terminated the interview. This may be done, for example, checking if a connection still exists between the user and the interviewer computer. In another example, the interviewer computer may send the user device a message containing text for a question such as, "are you still there?" The user may respond to the question, thereby indicating that the interview has not been terminated. If it is determined that the user has terminated the interview, then the server computer may perform step S420 in which the interview script is terminated and the session is ended. Otherwise, the server computer may return to step S413, in which the server computer waits for the user to enter additional data. The time it takes for the user to respond may be identified as a feature (i.e. for making predictions using the AI model) and may be used to update short-term history.

If at step S408 it is determined that a live interview should be initiated, then step S418 may be performed. In one embodiment, a live interview may be initiated if the score for the interview drops below a predetermined threshold (e.g. low risk score, low inaccuracy score, etc.) At step S418, a live agent may be requested. The live agent may be requested, by the server computer, by determining an address of a live agent. For example, the server computer may search through a list of IP addresses for computers operated by live agents, and may broadcast, to the computers, a message indicating that a user needs to be connected to a live agent. In another example, the server computer may search through a list of telephone numbers at which a live agent may be contacted, and may attempt to reach the agents through telecommunications.

At step S419, the server computer may route the user device to a live agent. For example, a live agent may receive a queue of users for which a live agent has been requested, and the live agent may select one of the users from the queue. The server computer may then route the user device to the live agent's computer or telecommunications device. The live agent may further receive the user's information. For example, the initial data entered by the user, the user's history, and other information relating to the interview between the user and the interviewer computer may be sent and displayed to the live agent.

At step S420, the interview script may be terminated. For example, the user may either have been successfully routed to a live agent whom they may continue the interview with, or the user may have decided to quit the interview. According to embodiments of the invention, the interview may be conducted such that genuine users may be connected to a live agent who may process a filed claim, while high risk or disingenuous users may continue to receive questions from the interview script until they quit or submit accurate information.

Figure 5:
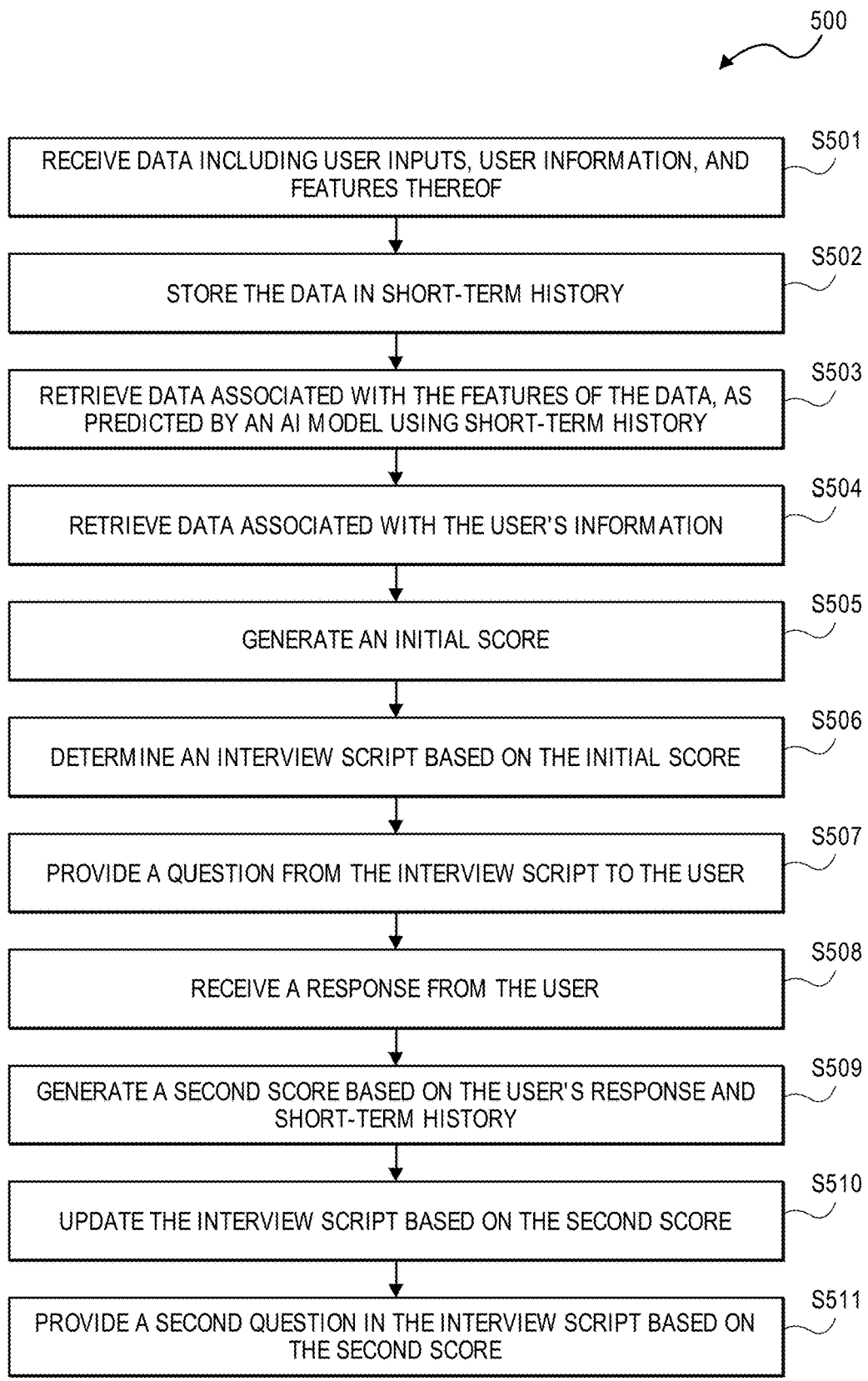
FIG. 5 shows a flowchart for a method for generating a dynamic interview script according to an embodiment of the invention.

FIG. 5 shows a flowchart for a method for generating a dynamic interview script according to an embodiment of the invention. Steps S501 through S511 may provide a list of steps performed by a system comprising a user device of a user, an interviewer computer, and a server computer (e.g. system 200 of FIG. 2).

At step S501, user input, user information, and features thereof may be received in data. The data may be received from a user device, and may be data relating to a claims submission. For example, the data may include a text description of a claim that a user wishes to file. The features of the user input and user information may be risk features for a potentially fraudulent claim submission such as a time of day, a claim type, and a method of entry.

At step S502, the data may be stored in short-term history. The short-term history may be a database storing data from which an AI model may use to make predictions about the interview. For example, an AI model may be trained to make a prediction based on one or more features of data received in an interview such as the time of day, the claim type, the method of entry, and/or the time it takes a user to respond. The prediction may be an assessed risk of the interview based on the features, which may further be used in combination with user history to determine a risk score.

At step S503, data associated with the features of the data may be retrieved. The data associated with the features may be data that is predicted by an AI model. The AI model may be a predictive model that takes in data from short-term history as input and outputs a prediction. For example, the AI model may be trained to score features that, when detected in data received in a claim submission, may be used to predict a level of riskiness or risk data associated with the claim submission. Examples of risk features for a claims submission may include a claim type, a claim complexity, a payout method, a monetization potential for a claim, and a repeatability of a submitted claim or text thereof.

At step S504, data associated with the user's information may be retrieved. For example, recorded instances of fraud associated with the user's name, account number, or user device may be retrieved from an aggregate database. The data associated with the user's information may be data that may be used as an input to a risk model or risk engine in order to generate a risk score. Other examples of risk data associated with a user may include a prior claims history, location of user device, location of reported incident, a time of day, a day of the week for a claim submission, a tendency to report higher payout claims, and/or a higher tendency to claim more serious health conditions.

At step S505, an initial score for the interview may be generated. The initial score may be any value that may be used to determine an appropriate response for a given situation (i.e. for a particular interview being conducted). In one embodiment, the initial score may be a risk score assessing the risk of inaccurate or false information being presented in the interview. In another embodiment, the initial score may be a mood score (e.g. a mood score that assesses the frustration level of the user).

At step S506, an interview script may be determined based on the initial score for the interview. The interview script may be determined by performing a graph query, in which a conceptual graph of words and phrases appropriate for the current conversation (i.e. based on the user inputted text and initial score) may be retrieved. The concepts of the conceptual graph may comprise interrelated concepts that may be used to describe an interview, as provided by logic of a semantic decision table. For example, the semantic decision table may comprise a rule stating that for high risk interviews involving cardholder 'Rick' claiming a lost/stolen credit card, 'interview script A: HighRisk' should be initiated. In a topological graph (e.g. concept graph), input nodes for 'high risk', 'Cardholder: Rick', and 'lost/stolen' may be linked to one another by edges and may further be linked to an output node for an interview script. In one embodiment, an appropriate interview script may be determined by finding optimal paths in a graph for linking nodes (i.e. interview concepts) to an interview script that contains questions that lead to greater effect on an interview score (e.g. questions that provoke responses that greatly increase or decrease a risk score). In one embodiment, optimal paths may be found using an ant colony optimization algorithm.

At step S507, a question from the determined interview script may be provided to the user. The question may be a follow-up question to the user's inputs that may assist in clarifying the accuracy of information (e.g. the accuracy of information in a claim submission). The user may, in some instances, willingly give false information (such as in the case of fraud) or may have accidently entered information incorrectly. In either case, the follow-up question may be a question that may change the initial score for the interview to further drive decisions and reach an optimal outcome (e.g. only allowing genuine information to be included in a processed claim or deterring criminal actors from gaming the system).

At step S508, a response from the user may be received. The user response may contain one or more features, which may include method of entry, and/or the time it takes the user to respond. The AI model may further use the one or more features to make a prediction, such as an assessed risk, which may be data that is associated with (i.e. linked to) the one or more features (e.g. as stored in a table or tree). The response from the user and the data associated with the one or more features may be stored in short-term history along with the data stored at step S502.

At step S509, a subsequent score may be generated based on the user's response and the data stored in short-term history. The subsequent score may reflect the current state of the interview's assessed level of accuracy or riskiness. For example, the user response may contain a clarification or revision of mistakenly entered information, which may cause a second risk score to be lower than the initial risk score for the interview.

At step S510, the interview script may be updated based on at least the second score. For example, the second score may result in a different graph query, and may contain different concepts for determining an appropriate interview script. The updated interview script may contain new questions or concepts that may be used to drive the interview towards a desired direction (e.g. may contain questions or responses that may lower the user's level of frustration).

At step S511, a second question in the interview script may be provided based on the second score. In one embodiment the second question may be provided by the server computer to the interviewer computer. In another embodiment, the second question may be selected from the interview script by the interviewer computer or operator thereof. For example, the interview script may contain concepts of a conceptual graph that may be used by an operator of the interviewer computer to ask the question, "excellent, can you wait one moment while we look up your information?"

According to embodiments of the invention, subsequent scores for the interview may be generated based on user responses. The subsequent scores may be used to update the interview script, so that the user may be provided follow-up questions that allow them to clarify information. The subsequent scores may also be used to determine that the user has willingly given false information, which may then result in a continuous interview script in which the user may receive question after question until he or she terminates the interview.

Figure 6:
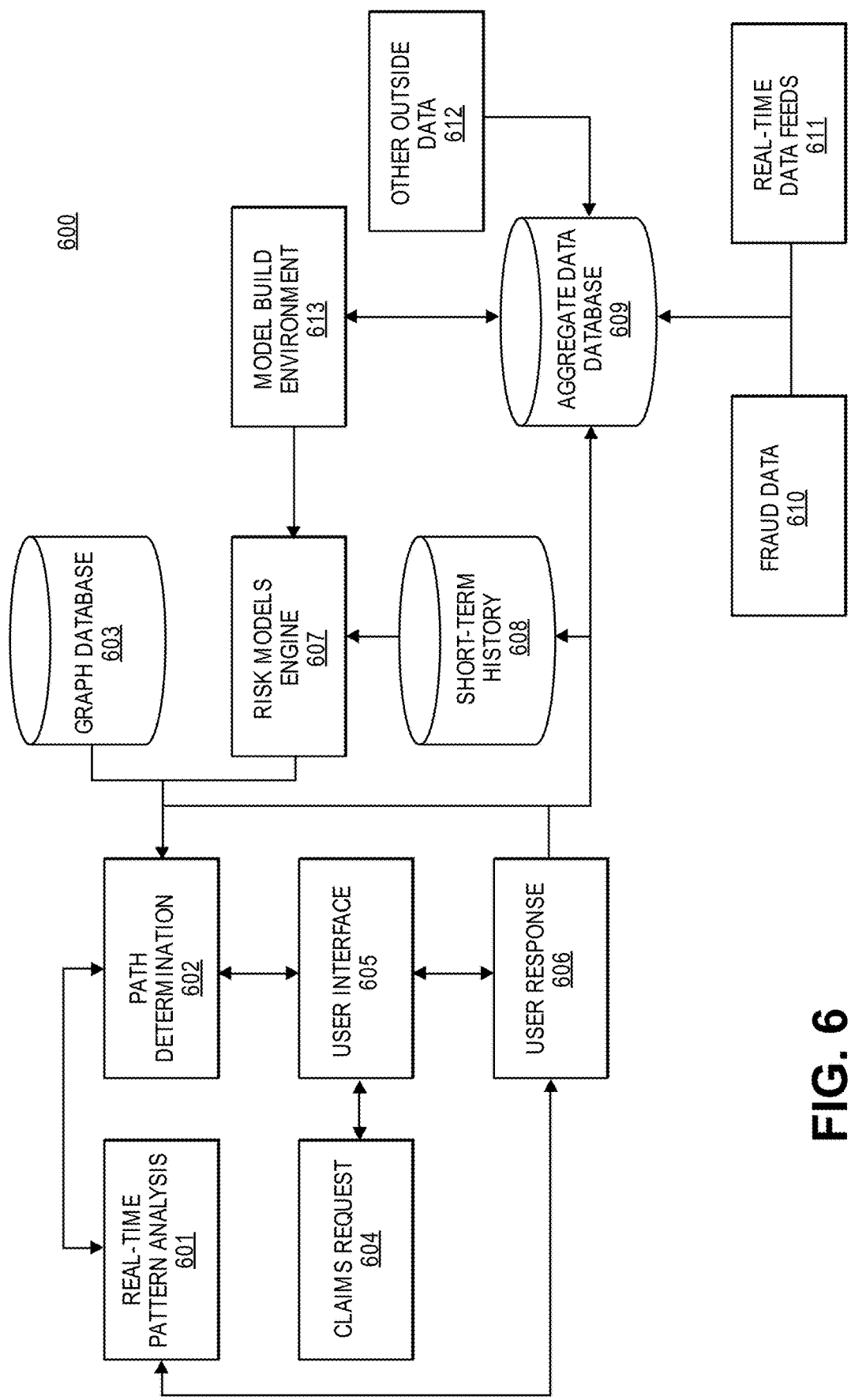
FIG. 6 shows a depiction of a data flow diagram for an automated claim submission system according to an embodiment of the invention.

FIG. 6 shows a depiction of a data flow diagram for an automated claim submission system according to an embodiment of the invention. Data flow 600 may comprise a plurality of databases such as graph database 603, short-term history 608, and aggregate data database 609, which may be updated and accessed in conjunction with data such as real-time pattern analysis 601, path determination 602, claims request 604, user interface 605, user response 606, risk models engine 607, fraud data 610, real-time data feeds 611, other outside data 612, and model build environment 613.

Real-time pattern analysis 601 may comprise instructions for analyzing patterns of user response 606 in relation to path determination 602. For example, a user may submit a response to a question during an interview that comprises specific text, and the text may then be used to determine paths in a graph in real-time using an AI model. The path determined in path determination 602 may be a path in a graph queried from graph database 603, such as a conceptual graph relating words or phrases (concepts) to specific user responses and features thereof. Paths may be determined using an optimization technique that finds shortest paths in a graph (e.g. ant colony optimization). A determined path may be a path that connects nodes for concepts related to a claims submission to nodes indicating a probability of fraud. For example, the queried graph may be a topological graph in which input nodes relating to a Medicaid claim with a significantly high payout are highly connected to an output node for fraud.

In one embodiment, real-time learning may be performed by creating profiles for various claim signatures. For example, a K-means model for clustering different risk factors together may be continually rebuilt as new data is received. The clusters may correspond to various profiles of claim signatures that are associated with specific levels of risk. An incoming claim submission may be grouped into a cluster, which may comprise different claim signature risk factors as the interview progresses. For example, a change in a cluster's claim signature risk factor may be triggered if a high-level of drift between clusters (i.e. a significant difference in risk scores between closely related clusters) is detected.

User Interface 605 may be a graphical user interface in which a user may submit a claims request 604 as well as submit a user response 606. For example, user interface 605 may be a window that may be displayed on a user device that accepts text from a user, which may then be submitted to a server computer to determine a path in path determination 602. The user interface may further comprise logic that may be used to perform method of entry analysis. For example, the user interface may comprise code for detecting pauses between typed inputs and detecting if words have been copy and pasted. The method of entry analysis may then further affect a determined or updated interview script. For example, the method of entry of a user response may be associated with one or more risk features from which an AI model may use to generate a risk score and predict an appropriate graph query. In one embodiment, packages of information on relating to how data is entered may be a client-based real-time monitoring tool developed using JavaScript. Data received from a user response may be stored in short-term history, so that features of the data may be used as inputs to a predictive model (i.e. AI model).

Risk models engine 607 may comprise instructions for determining a risk score assessing the risk associated with information of, or entered by, a user. The risk associated with information of, or entered by, the user may be determined from user information and user entered text stored in short-term history (e.g. from user response 606), and may be determined using an AI model.

An AI model may be created in model build environment 613, using training data from aggregate data database 609. For example, a learning algorithm may use fraud data 610, real-time data feeds 611, and other outside data 612 as training data, and the AI model may be trained to recognize patterns in user responses for making predictions. Fraud data 610 and real-time data feeds 611 may be data collected from a transaction network (e.g. VisaNet), in which transaction data and characteristic thereof may be recorded. For example, fraud data 610 may comprise data for flagging fraudulent transactions, and real-time data feeds 611 may comprise data for transactions between consumers and merchants as they occur. Other outside data 612 may comprise any other data that may be aggregated to facilitate training, such as social-media data or census data.

Predictions made by the created AI model may be used to determine risk associated with an interview as well as determine paths in a graph so that an appropriate interview script may be generated. During an interview, user responses may further be stored in aggregate data database 609, such that the AI model may be updated. The AI model may then recognize patterns, and determine an optimal path within a graph of graph database 603, that may be used to determine or update an interview script. Thus, the interview script may be dynamically generated in a way that does not allow a user to easily predict follow-up questions to each user response 606.

Figure 7:
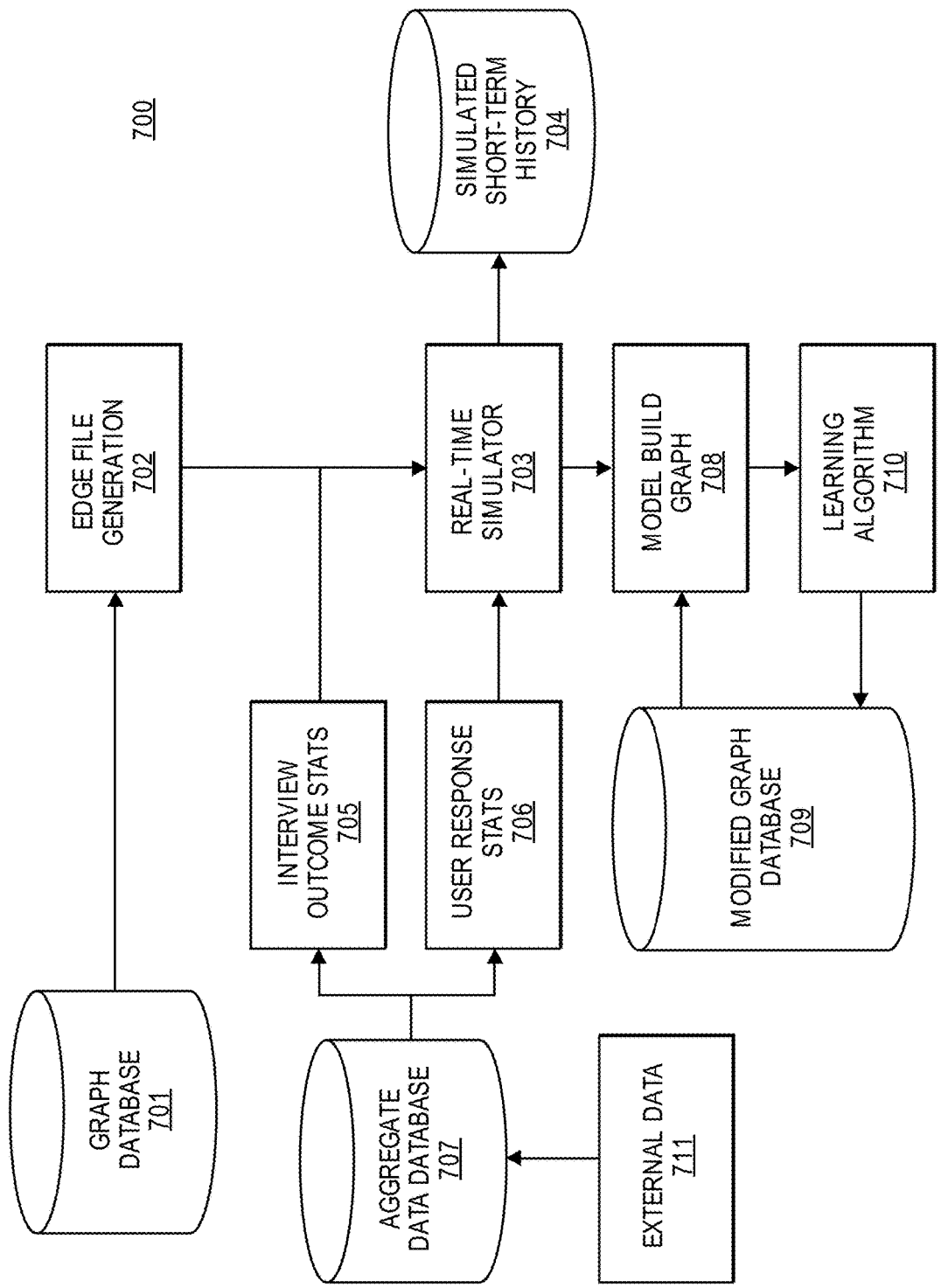
FIG. 7 shows a data flow diagram for building an artificial intelligence model for generating an interview script according to an embodiment of the invention.

FIG. 7 shows a data flow diagram for building an artificial intelligence model for generating an interview script according to an embodiment of the invention. Data flow 700 may comprise one or more databases including graph database 701, simulated short-term history, aggregate data database 707, and modified graph database 709, which may be accessed and updated in conjunction with edge file generation 702, real-time simulator 703, interview outcome stats 705, user response stats 706, model build graph 708, learning algorithm 710, and external data 711.

According to embodiments of the invention, the elements of system 700 may be controlled and/or utilized by a server computer, such as server computer 300A of FIG. 3. The server computer may begin building an AI model by accessing graph database 701. The graph database 701 may comprise a plurality of topological graphs. The topological graphs may be conceptual graphs, wherein concepts relating to an interview script may be connected by edges. For example, conceptual graphs may comprise nodes for a user ID, a type of claim, and a risk score, which may be connected to various words or phrases that may be included in an interview script. An example of a conceptual graph is further described in FIG. 8 below.

The server computer may begin generating edges for graphs in graph database 701 in edge file generation 702. Edge file generation may comprise instructions for connecting related nodes in a topological graph. For example, edge file generation may comprise code for linking nodes for various concepts or data relating to a claims submission together in order to build a conceptual graph that may be used to determine an interview script.

Edges in a graph may be generated based on data relating to an interview, such as data relating to a claims submission. The data may be collected from aggregate data database 707, in which interview data and external data 711 may be aggregated. The collected data may be used to determine interview outcome stats 705 and user response stats 706. For example, aggregate data database may comprise data relating to the whether or not an interview ended in an identification of fraud, an identification of a genuinely submitted claim, or any other possible outcome for an interview, and may further comprise data relating to information about user responses, such as whether or not a user response increased or decreased a risk score for the interview.

The interview outcome stats 705 and user response stats 706 may be fed into a real-time simulator, in which information collected from interviews may be used to generate a sequence graph. The sequence graph may be a graph in which sequences of nodes may be truncated to form rules. Each rule may be a path in a graph, which links nodes relating to interview data to nodes for concepts that may be used to determine an appropriate interview script. For example, a sequence graph may comprise a path of nodes in which nodes for 'cardholder: Rick', 'high risk', and 'lost/stolen card' may be linked together to 'Interview Script A.' Data for the sequence graph may be stored in simulated short-term history 704, so that a sequence path may be used to simulate how a potential interview may end.

If a generated sequence graph comprises a new rule, then the sequence path for the new rule may end. The new rule may be used to build an AI model for determining a dynamic interview script. Model build graph 708 may build an AI model based on the new rules determined from real-time simulator 703, as well as data from modified graph database 709, and learning algorithm 710. Learning algorithm 710 may comprise a learning algorithm, in which features of an interview may be used to determine optimal paths in a graph. Optimal paths for the graphs may be recorded in graph database 709.

According to embodiments of the invention, an AI model may be used to determine an interview script that may prevent the inclusion of inaccurate information in a processed claim or that may deter a criminal actor from a gaming a claim submission system. For example, the AI model generated using system 700 may be an AI model that detects features in a claims submission such as a claim type, features related to the method of entry of a claim, and risk levels associated with a user in order to predict an interview script that may assist in identifying if a user is lying. The AI model may predict the appropriate interview script by identifying a path in a queried graph, in which claim data in an interview may be linked to a specific set of words or phrases based on learned rules.

Figure 8:
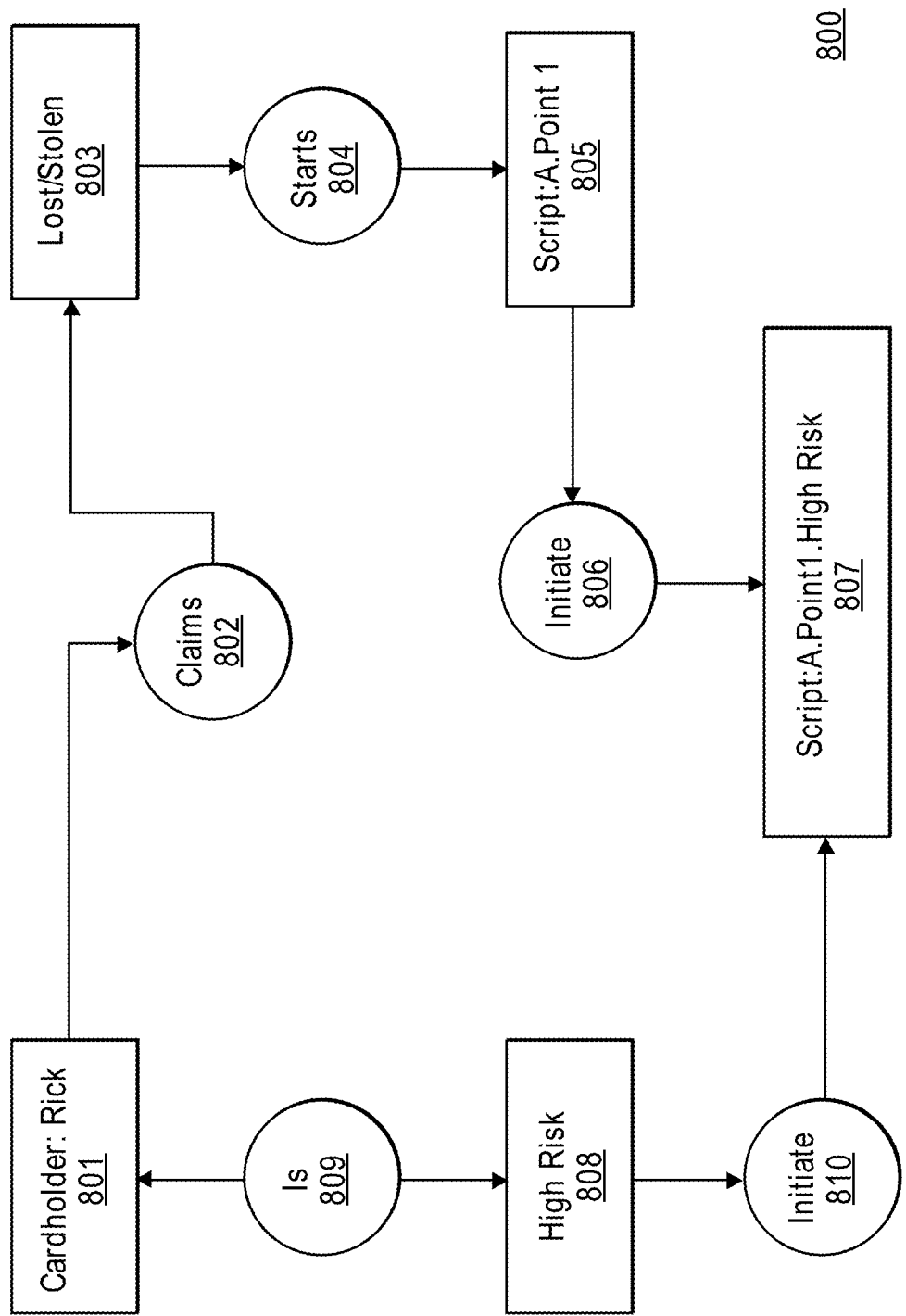
FIG. 8 shows an example of a path of nodes in a concept graph according to an embodiment of the invention.
Figure 9:
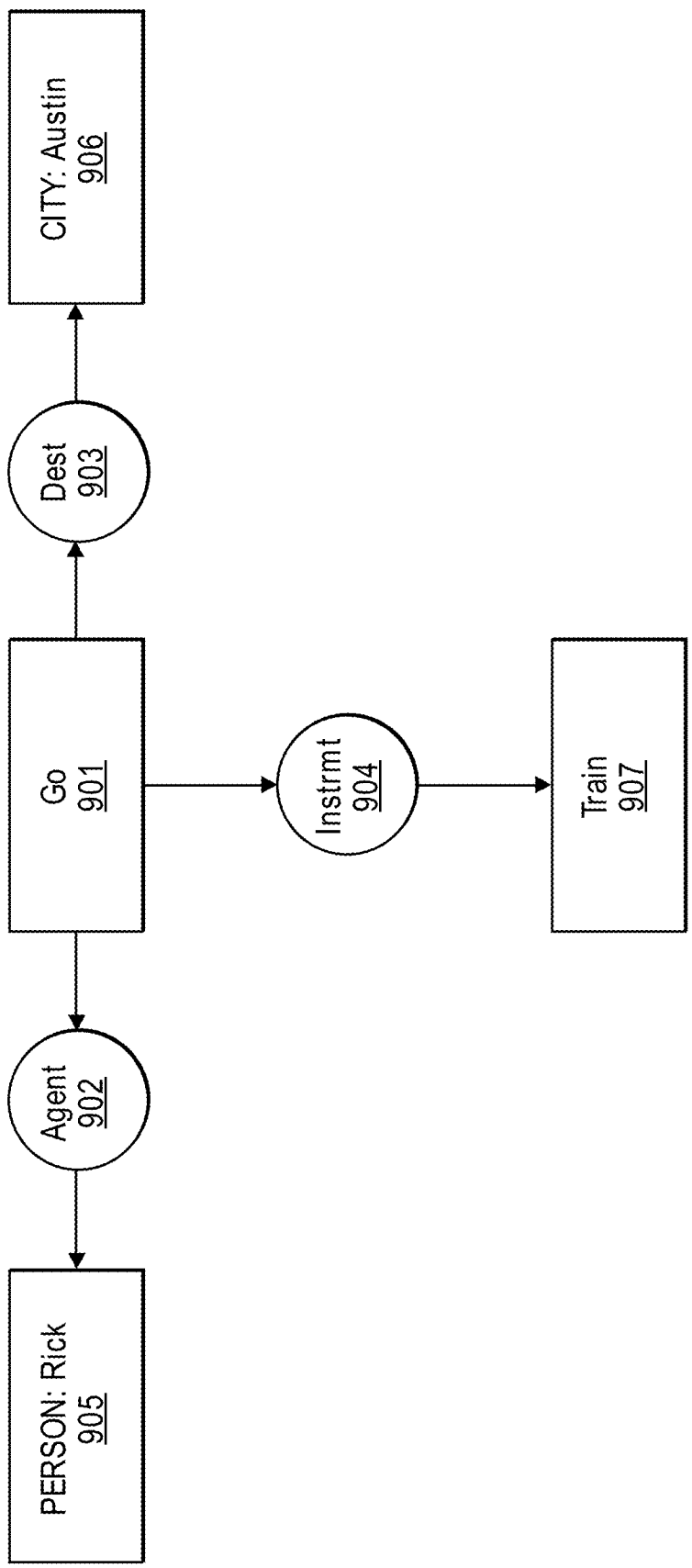
FIG. 9 shows an example of a conceptual graph.

FIG. 8 shows an example of a path of nodes in a concept graph according to an embodiment of the invention. According to embodiments of the invention, the graph may be a conceptual graph for determining an interview script, and may be queried from a graph database during a dynamic interview process (e.g. during a claims submission). An advantage of using a topological graph, such as a conceptual graph, to determine an interview script is that relationships between concepts (e.g. relationships between claim data and risk levels) can be learned and re-evaluated, and optimal paths within the graph may be determined for reaching a desired outcome (e.g. for preventing inaccurate information from being submitted in a processed claim). This differs from determining interview questions from a hardcoded table or tree, in that better suited questions may be determined as learning occurs, and as connections are evaluated.

Example path 800 may comprise a set of nodes such as node 801:

'Cardholder: Rick 801', node 802: 'claims', node 803: 'Lost/Stolen', node 804: 'Starts', node 805: 'Script: A.Point1', node 806: 'initiate', node 807: 'Script: A.Point1.HighRisk', node 808: 'HighRisk', node 809: 'Is', and node 810: 'Initiate'. In the conceptual graph shown, nodes for concepts may be shown as rectangles, and nodes for conceptual relations that link concepts may be shown as circles.

During an interview, data associated with a user and data associated with a claim submitted by the user may be received by a server computer (e.g. server computer 300A of FIG. 3). The data may be used to perform a graph query, in which a conceptual graph comprising nodes related to the data may be retrieved. From the conceptual graph, an appropriate interview script for the current state of the interview may be determined.

For example, during an interview, a user may submit a claim for a stolen credit card. An AI model comprising a tiered modeling architecture of separate sub-modules may be used to determine data associated with the user and the entered claim. For example, a neural network may be used to determine communication risk factors associated with the user's IP address and device ID, and risk factors associated with data entered by the user may be determined using risk profiles developed though unsupervised learning (e.g. clustering). A risk score for the interview may further be determined from the data associated with the user and the entered claim. For example, a risk scoring engine running on the server computer may take a user's stored history and risk features associated with a claim as inputs, and may output a risk score based on risk modeling performed in a transaction processing network.

Based on the risk score and data associated with the user and submitted claim, a graph query may be performed by the server computer. The queried graph may be a conceptual graph comprising example path 800. Example path 800 may then be used to initiate an interview script. For a claim comprising 'cardholder:ABC' claiming a card being 'lost or stolen' may cause 'Script:A.Point1' to be initiated. 'Script: A.Point1' may be an initial interview script that may comprise one or more responses or follow-up questions for receiving additional information from the user. For example, the initial interview script may comprise the following: "Please Enter: Time of day and Exact Location of Incident."

Responses from the interview script may be sent from an interviewer computer to the user's device, and the user may then enter a user responses comprising additional information (e.g. user enters the time of day and exact location of the reported incident). The additional information may then change the calculated risk score for the interview, and may result in an updated interview script. For example, the user may enter a time of day and exact location that was previously used in a fraudulent claim submission, which may cause the risk score to change to 'High Risk'. The interview script may then be updated, and may comprise additional follow-up responses that may extract further information from the user. For example, the updated interview script may then comprise the following questions: "Did you notify the police? If so, enter contact information; Why were you at the location?; Did you notify surrounding businesses?"

According to embodiments of the invention, interview scripts determined using the AI model may be generated such that only accurate information may be included in a processed claim. For example, an interview determining to be associated with a high risk of inaccurate or false information may result in a continuous interview script containing more aggressive questioning. If the risk score for the interview continues to increase or remain at high levels, then follow-up questions may be continually sent to the user until he or she quits the interview. If the user begins to clarify information such that the information is accurate or if the user begins to act in a manner that is determined to be genuine (as recognized through learned patterns), the risk score for the interview may lower. If the risk score decreases below a predefined threshold, then the user may be routed to a live interview, wherein a human representative may process the claim filed by the user.

Embodiments of the invention provide a number of technical advantages over prior art. Prior methods for generating an interview script involved merely generating static scripts for each situation. In prior methods, each script or response is mapped as a static decision, and criminal actors are able to game the system by learning what type of responses resulted in a set of decisions that lead to their desired outcome (e.g. processing of a fraudulent claim). In contrast, embodiments of the present invention utilize an AI model that may continuously learn during an interview, and may be used to dynamically change an interview script in ways that cannot be easily predicted by a user. Furthermore, in other claims submission processes, human error on both the part of the user and the interviewer may result in undesired results. For example, a confusing user interface may cause a user to incorrectly enter information, or a poorly trained interviewer may interact with a user in a manner that frustrates the user. Embodiments of the invention remedy these issues by constantly evaluating the state of an interview via scoring and modeling, which may provide tailored questions for clarifying information and driving an interview towards a desired outcome.

Any of the computer systems mentioned herein may utilize any suitable number of subsystems. Examples of such subsystems are shown in FIG. 2 in computer apparatus 202, 210, and 220. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 2 may be interconnected via a system bus. Additional subsystems such as a printer, keyboard, storage device(s), monitor, which is coupled to display adapter, and others are shown. Peripherals and input/output (I/O) devices, which couple to I/O controller, can be connected to the computer system by any number of connections known in the art such as input/output (I/O) port (e.g., USB, FireWire). For example, I/O port or external interface (e.g. Ethernet, Wi-Fi, etc.) can be used to connect computer system to a wide area network such as the Internet, a mouse input device, or a scanner. The interconnection via system bus allows the central processor to communicate with each subsystem and to control the execution of a plurality of instructions from system memory or the storage device(s) (e.g., a fixed disk, such as a hard drive, or optical disk), as well as the exchange of information between subsystems. The system memory and/or the storage device (s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated.

All patents, patent applications, publications, and descriptions mentioned herein are incorporated by reference in their entirety for all purposes. None is admitted to be prior art.

What is claimed is:

1. A method comprising:
a) receiving, by a first computer, data relating to a claim submission from a second computer, wherein the data relating to the claim submission includes claims submission data input by a user, information relating to the user, and one or more features, wherein the claim submission is a request for something that is owed to the user;
b) storing, by the first computer, the data relating to the claim submission in a first database;
c) retrieving, by the first computer, from the first database, data associated with the one or more features, wherein the data associated with the one or more features is determined from an artificial intelligence model, wherein the artificial intelligence model is built by
accessing a graph database to obtain a plurality of topological graphs,
generating a plurality of edges associated with nodes in the topological graphs to build a conceptual graph, and
inputting interview outcome data, user response data, and the conceptual graph into a real time simulator to build one or more sequence graphs, the one or more sequence graphs used to generate the artificial intelligence model;
d) retrieving, by the first computer, from a second database, data associated with the information relating to the user;
e) generating, by the first computer, a first score based on the data input by the user, the data associated with the one or more features and the data associated with the information relating to the user, the first score evaluating whether the data input by the user is fraudulent;
f) determining, by the first computer, an interview script based at least upon the first score;
g) providing, by the first computer, a first question in the interview script to the second computer;
h) receiving, by the first computer, from the second computer, a response to the first question
i) generating, by the first computer, a second score based at least upon the data in the first database and the response to the first question, and then updating, by the first computer, the artificial intelligence model using at least the second score and the response to the first question;
j) updating, by the first computer, the interview script based at least upon the second score and the updated artificial intelligence model; and
k) providing, by the first computer, a second question in the updated interview script to the second computer, the second question based at least in part upon the second score.

2. The method of claim 1 further comprising:
l) receiving, by the first computer, from the second computer, a response to the second question;
m) generating, by the first computer, a third score based at least upon the data in the first database and the response to the second question;
n) updating, by the first computer, the updated interview script based at least upon the third score to form a subsequently updated interview script; and
o) providing, by the first computer, a third question in the subsequently updated interview script to the second computer, the third question based at least in part upon the third score.

3. The method of claim 2, wherein the one or more features include a time of day, a claim type, a method of entry, and an average time to respond.

4. The method of claim 2, wherein the one or more features include a time of day, a claim type, a method of entry, and/or an average time to respond.

5. The method of claim 2, wherein the data relating to the claim submission is received by the second computer from a user device of the user, and wherein the information relating to the user includes information relating to the user device.

6. The method of claim 2, wherein the one or more features include features of text inputted by the user, and wherein the features of the text inputted by the user are determined using a natural language parser.

7. The method of claim 2, wherein the one or more features are risk features relating to a risk of inaccurate information being included in the data relating to the claim submission, and wherein the first score, second score, and third score are risk scores.

8. The method of claim 1, wherein the first computer continues to provide questions to the second computer if a continually updated score remains above a predetermined value, and wherein the user is routed to a live interview with a human representative if a continually updated score drops below another predetermined value.

9. A server computer comprising:
a network interface;
a processor; and
a non-transitory computer-readable medium comprising code for instructing the processor to implement a method, the method comprising:
a) receiving, by the server computer, data relating to a claim submission from a client computer, wherein the data relating to the claim submission includes claims submission data input by a user, information relating to the user, and one or more features, wherein the claim submission is a request for something that is owed to the user;
b) storing, by the server computer, the data relating to the claim submission in a first database;

c) retrieving, by the server computer, from the first database, data associated with the one or more features, wherein the data associated with the one or more features is determined from an artificial intelligence model, wherein the artificial intelligence model is built by
accessing a graph database to obtain a plurality of topological graphs,
generating a plurality of edges associated with nodes in the topological graphs to build a conceptual graph, and
inputting interview outcome data, user response data, and the conceptual graph into a real time simulator to build one or more sequence graphs, the one or more sequence graphs used to generate the artificial intelligence model;
d) retrieving, by the server computer, from a second database, data associated with the information relating to the user;
e) generating, by the server computer, a first score based on the data input by the user, the data associated with the one or more features and the data associated with the information relating to the user, the first score evaluating whether the data input by the user is fraudulent;
f) determining, by the server computer, an interview script based at least upon the first score;
g) providing, by the server computer, a first question in the interview script to the client computer;
h) receiving, by the server computer, from the client computer, a response to the first question;
i) generating, by the server computer, a second score based at least upon the data in the first database and the response to the first question, and then updating the artificial intelligence model using at least the second score and the response to the first question;
j) updating, by the server computer, the interview script based at least upon the second score and the updated artificial intelligence model; and
k) providing, by the server computer, a second question in the updated interview script to the client computer, the second question based at least in part upon the second score,
wherein the server computer continues to provide questions to the client computer if a continually updated score remains above a predetermined value, and wherein the user is routed to a live interview with a human representative if a continually updated score drops below another predetermined value.

10. The server computer of claim 9, wherein the method further comprises:
l) receiving, by the server computer, from the client computer, a response to the second question;
m) generating, by the server computer, a third score based at least upon the data in the first database and the response to the second question;
n) updating, by the server computer, the updated interview script based at least upon the third score to form a subsequently updated interview script; and
o) providing, by the server computer, a third question in the subsequently updated interview script to the client computer, the third question based at least in part upon the third score.

11. The server computer of claim 10, wherein the one or more features include a time of day, a claim type, a method of entry, and/or an average time to respond.

12. The server computer of claim 10, wherein the data relating to the claim submission is received by the client computer from a user device of the user, and wherein the information relating to the user includes information relating to the user device.

13. The server computer of claim 10, wherein the one or more features include features of text inputted by the user, and wherein the features of the text inputted by the user are determined using a natural language parser.

14. The server computer of claim 10, wherein the one or more features are risk features relating to a risk of inaccurate information being included in the data relating to the claim submission, and wherein the first score, second score, and third score are risk scores.

15. The server computer of claim 9, wherein the server computer continues to provide questions to the client computer if a continually updated score remains above a predetermined value, and wherein the user is routed to a live interview with a human representative if the continually updated score drops below another predetermined value.

16. A client computer comprising:
a network interface;
a processor; and
a non-transitory computer-readable medium comprising code for instructing the processor to implement a method, the method comprising:
a) sending, by the client computer, data relating to a claim submission to a server computer, wherein the data relating to the claim submission includes claims submission data input by a user, information relating to the user, and one or more features, wherein the claim submission is a request for something that is owed to the user;
b) receiving, by the client computer, a first question in an interview script from the server computer, wherein the interview script is determined based at least upon a first score generated based on data determined from an artificial intelligence model using the data relating to the claim submission, the first score evaluating whether the data input by the user is fraudulent, wherein the artificial intelligence model is built by
accessing a graph database to obtain a plurality of topological graphs,
generating a plurality of edges associated with nodes in the topological graphs to build a conceptual graph, and
inputting interview outcome data, user response data, and the conceptual graph into a real time simulator to build one or more sequence graphs, the one or more sequence graphs used to generate the artificial intelligence model;
c) sending, by the client computer, the first question in the interview script to a user device of the user;
d) receiving, by the client computer, a response to the first question;
e) forwarding, by the client computer, the response to the first question to the server computer, wherein the server computer generates a second score, updates the artificial intelligence model using the response to the first question and the second score, and obtains an updated interview script using the updated artificial intelligence model; and
f) receiving, by the client computer, a second question in the updated interview script from the server computer, wherein the second question is determined based at least upon the second score generated based at least upon the response to the first question.

17. The client computer of claim 16, wherein the first and second scores are generated based on data associated with one or more features included in the data relating to the claim submission.

18. The client computer of claim 17, wherein the method further comprises:
   g) sending, by the client computer, to the server computer, a response to the second question; and
   h) receiving, by the client computer, a third question in a subsequently updated interview script based on the updated interview script from the server computer, the third question based at least in part upon a third score generated based at least upon the response to the second question.

19. The method of claim 16, wherein the server computer continues to provide questions to the client computer if a continually updated score remains above a predetermined value, and wherein the user is routed to a live interview with a human representative if a continually updated score drops below another predetermined value.

20. The method of claim 10, wherein the one or more features include a time of day, a claim type, a method of entry, and/or an average time to respond.

* * * * *